(12) United States Patent
Tada et al.

(10) Patent No.: US 11,923,759 B2
(45) Date of Patent: Mar. 5, 2024

(54) POWER CONVERSION APPARATUS AND DRIVING METHOD FOR POWER CONVERSION APPARATUS

(71) Applicant: TOSHIBA MITSUBISHI-ELECTRIC INDUSTRIAL SYSTEMS CORPORATION, Chuo-ku (JP)

(72) Inventors: Keiko Tada, Chiyoda-ku (JP); Hiromitsu Suzuki, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 227 days.

(21) Appl. No.: 17/621,025

(22) PCT Filed: Jun. 28, 2019

(86) PCT No.: PCT/JP2019/025907
§ 371 (c)(1),
(2) Date: Dec. 20, 2021

(87) PCT Pub. No.: WO2020/261556
PCT Pub. Date: Dec. 30, 2020

(65) Prior Publication Data
US 2022/0302820 A1 Sep. 22, 2022

(51) Int. Cl.
*H02M 1/12* (2006.01)
*H02M 1/08* (2006.01)
(Continued)

(52) U.S. Cl.
CPC ............ *H02M 1/12* (2013.01); *H02M 1/08* (2013.01); *H02M 7/5395* (2013.01); *H02P 27/08* (2013.01)

(58) Field of Classification Search
CPC ...... H02M 7/487; H02M 1/08; H02M 7/5395; H02M 1/12; H02P 27/08
See application file for complete search history.

(56) References Cited

U.S. PATENT DOCUMENTS
2017/0302154 A1  10/2017  Tada et al.

FOREIGN PATENT DOCUMENTS
JP    2010-200537 A     9/2010
WO   WO-2011135695 A1 * 11/2011 ............ B60K 6/445
WO   WO 2016/104370 A1   6/2016

OTHER PUBLICATIONS
International Search Report dated Aug. 27, 2019 in PCT/JP2019/025907, filed on Jun. 28, 2019, 2 pages.
(Continued)

*Primary Examiner* — Said Bouziane
(74) *Attorney, Agent, or Firm* — Oblon, McClelland, Maier & Neustadt, L.L.P.

(57) ABSTRACT

In a power conversion device for performing conversion from DC to AC, a positive-side capacitor and a negative-side capacitor with their connection point serving as a neutral point are provided between the positive and negative sides of the inputted DC power, and a switching pattern for specifying switching phases which are timings of ON/OFF driving switching elements of an inverter which outputs AC voltage having at least a positive-side potential, a negative-side potential, and a neutral point potential, is calculated so as to satisfy conditions for ensuring a modulation factor, eliminating harmonic components for respective orders of output voltage, ensuring a predetermined value for a phase difference between adjacent switching phases, and balancing voltage of the positive-side capacitor and voltage of the negative-side capacitor.

7 Claims, 27 Drawing Sheets

(51) Int. Cl.
*H02M 7/5395* (2006.01)
*H02P 27/08* (2006.01)

(56) References Cited

OTHER PUBLICATIONS

Patel, H., et al. "Generalized Techniques of Harmonic Elimination and Voltage Control in Thyristor Inverters: Part I—Harmonic Elimination", IEEE Transactions on Industry Applications, vol. 1A-9, No. 3, 1973, pp. 310-317.

* cited by examiner

| LEG A | LEG B | OUTPUT VOLTAGE | NEUTRAL POINT CURRENT icu |
|---|---|---|---|
| P | P | +2E | 0 |
| P | C | +1E | iu |
| C | P | +1E | -iu |
| P | N | 0 | 0 |
| C | C | 0 | 0 |
| N | P | 0 | 0 |
| C | N | -1E | -iu |
| N | C | -1E | iu |
| N | N | -2E | 0 |

FIG. 11

| COMBINATION | 1 | | 2 | | 3 | | 4 | |
|---|---|---|---|---|---|---|---|---|
| LEG A | P | | N | | C | | C | |
| LEG B | C | | C | | P | | N | |
| icu | +iu | | +iu | | -iu | | -iu | |
| iu | iu > 0 | iu < 0 | iu > 0 | iu < 0 | iu < 0 | iu > 0 | iu < 0 | iu > 0 |
| icu PLUS/MINUS | icu > 0 | icu < 0 | icu > 0 | icu < 0 | icu > 0 | icu < 0 | icu > 0 | icu < 0 |
| Vdiff(Vpc-Vcn) | DECREASE | INCREASE | DECREASE | INCREASE | DECREASE | INCREASE | DECREASE | INCREASE |

FIG. 12

SPATIAL VECTOR AND
NEUTRAL POINT CURRENT ic

| VECTOR | ic |
|---|---|
| NNN | 0 |
| CCC | -iu -iv -iw = 0 |
| PPP | 0 |
| CNN | -iu |
| PCC | -iv -iw = iu |
| CNC | -iu -iw = iv |
| PCP | -iv |
| PNN | 0 |
| PNC | -iw |
| PNP | 0 |

FIG. 23

SPATIAL VECTOR AND
INCREASE/DECREASE IN CAPACITOR VOLTAGE DIFFERENCE

| VECTOR | CONDITION OF Vdiff INCREASE | CONDITION OF Vdiff DECREASE |
|---|---|---|
| CNN | $i_u > 0$ | $i_u < 0$ |
| PCC | $i_u < 0$ | $i_u > 0$ |
| CNC | $i_v < 0$ | $i_v > 0$ |
| PCP | $i_v > 0$ | $i_v < 0$ |
| PNC | $i_w > 0$ | $i_w < 0$ |

FIG. 24

POWER CONVERSION APPARATUS AND DRIVING METHOD FOR POWER CONVERSION APPARATUS

TECHNICAL FIELD

The present disclosure relates to a power conversion device for performing conversion from DC to AC.

BACKGROUND ART

As a pulse width modulation (PWM) control method in a power conversion device for performing conversion from DC to AC, triangular wave comparison PWM is generally used. In the triangular wave comparison PWM, it is necessary to increase the frequency of a PWM carrier in order to reduce harmonics of output voltage. However, the switching speed of switching elements such as GTO or IEGT used in a large-capacity inverter is slow, and therefore the frequency of the PWM carrier cannot be increased. As a result, there is a problem that low-order harmonics remain in the output voltage. Accordingly, a low-order harmonic elimination PWM control method is proposed in which switching is performed at a timing of reducing specific low-order harmonics by effectively utilizing a small number of times of switching (see, for example, Patent Document 1 and Non-Patent Document 1).

Patent Document 1 discloses a switching method for low-order harmonic elimination PWM in a so-called multi-level inverter. Specifically, Patent Document 1 discloses a designing method for low-order harmonic elimination PWM in which, in a 5-level inverter having a two-stage (two-leg) series configuration with each stage corresponding to 3-level switching, switching is performed at a timing of preventing occurrence of double switching voltage in line-to-line voltage and reducing harmonics.

Besides Patent Document 1, there is a document disclosing a PWM switching method for minimizing low-order harmonics with an extremely small number of times of switching such as one pulse in a multilevel inverter, e.g., Patent Document 2. Patent Document 2 discloses a designing method for low-order harmonic elimination PWM in which, in a 5-level inverter having a two-stage (two-leg) series configuration with each stage corresponding to 3-level switching, the number of order kinds of harmonics to be reduced is not directly limited by the number of pulses and therefore switching is performed at such a timing that harmonic components for a wide range of orders included in the output voltage are minimized even with a comparatively small number of pulses.

CITATION LIST

Patent Document

Patent Document 1: JP2010-200537A
Patent Document 2: WO2016/104370

Non-Patent Document

Non-Patent Document 1: HASMUKI S. PATEL et al. "Generalized Techniques of Harmonic Elimination and Voltage Control in Thyristor Inverters: Part I-Harmonic Elimination" IEEE TRANSACTION OF INDUSTRY APPLICATIONS, VOL. IA-9, NO. 3, MAY/JUNE 1973, pp. 310-317

SUMMARY OF THE INVENTION

Problems to be Solved by the Invention

In accordance with switching patterns that specify switching phases of switching elements composing an inverter, the modulation factor corresponding to the ratio of output voltage to input voltage is determined and at the same time, harmonic components to be included in the output voltage are also determined. In a case where there are a plurality of switching patterns that satisfy a target modulation factor, a switching pattern that can reduce a harmonic component for a desired order can be selected from the plurality of switching patterns. The switching patterns can be designed so that the number of order kinds of harmonics to be reduced is not directly limited by the number of pulses and therefore harmonic components for a wide range of orders in the output voltage are minimized even with a comparatively small number of pulses.

However, in a multilevel inverter of a neutral-point-clamped type, switching phases in a switching pattern for reducing low-order harmonics are determined by the modulation factor. Therefore, in a case of load operation in which the frequency or the voltage varies, depending on the switching pattern and the power factor, either of the switching times on the positive side and the negative side increases, so that the charging/discharging amounts of a positive-side capacitor and a negative-side capacitor provided on the DC input side are unbalanced. Thus, a voltage difference between the positive-side capacitor and the negative-side capacitor is greatly expanded and the potential at the neutral point varies, resulting in a problem of increasing current variation (torque ripple) during load operation.

The present disclosure has been made to solve the above conventional problem, and an object of the present disclosure is to provide a power conversion device that can suppress expansion of a difference between positive-side voltage and negative-side voltage of a DC input while reducing harmonics, during load operation.

Solution to the Problems

A power conversion device according to the present disclosure includes: an inverter which includes switching elements, and which receives DC voltage of a DC voltage source and converts the DC voltage to variable-voltage variable-frequency AC voltage, to output the AC voltage to a load; a control unit which performs PWM control for ON/OFF driving the switching elements on the basis of an output voltage command value and an output frequency command value; and a series unit of a positive-side capacitor and a negative-side capacitor, the series unit being connected on an input side of the inverter between a positive side and a negative side of the DC voltage. The inverter has, as output potentials, at least a positive-side potential and a negative-side potential of the DC voltage source and a potential of a neutral point which is a connection point between the positive-side capacitor and the negative-side capacitor. The control unit includes: a modulation factor calculator which calculates a modulation factor for the inverter on the basis of the DC voltage of the DC voltage source and the output voltage command value; a pulse number determination unit which determines a number of pulses per half cycle of a fundamental wave in the PWM control on the basis of the output frequency command value; a switching pattern determination unit which, on the basis of the modulation factor and the number of pulses, calculates a switching pattern for specifying switching phases which are timings of ON/OFF driving the switching elements, so as to satisfy conditions for ensuring the modulation factor, eliminating harmonic components for respective orders of output voltage of the inverter, ensuring a predetermined value for a phase difference between predetermined adjacent switching phases, and balancing voltage of the positive-side capacitor and voltage of the negative-side capacitor; and a gate signal generation unit which generates a gate signal for ON/OFF driving the switching elements on the basis of the switching pattern calculated by the switching pattern determination unit.

Effect of the Invention

In the power conversion device according to the present disclosure, a condition for balancing voltage of the positive-side capacitor and voltage of the negative-side capacitor is included in conditions when the switching pattern is calculated, thus providing an effect of suppressing expansion of the difference between the positive-side voltage and the negative-side voltage of the DC input while reducing harmonics, even during load operation.

BRIEF DESCRIPTION OF THE DRAWINGS

FIG. 11 is a table illustrating the relationship between the output potentials of switching legs and the neutral point current in the power conversion device according to embodiment 1.

FIG. 12 is another table illustrating the relationship between the output potentials of the switching legs and the neutral point current in the power conversion device according to embodiment 1.

FIG. 23 shows the relationship between a spatial vector and neutral point current in the power conversion device according to embodiment 3.

FIG. 24 illustrates the relationship between the spatial vector and increase/decrease of a capacitor voltage difference in the power conversion device according to embodiment 3.

DESCRIPTION OF EMBODIMENTS

Figure 1:
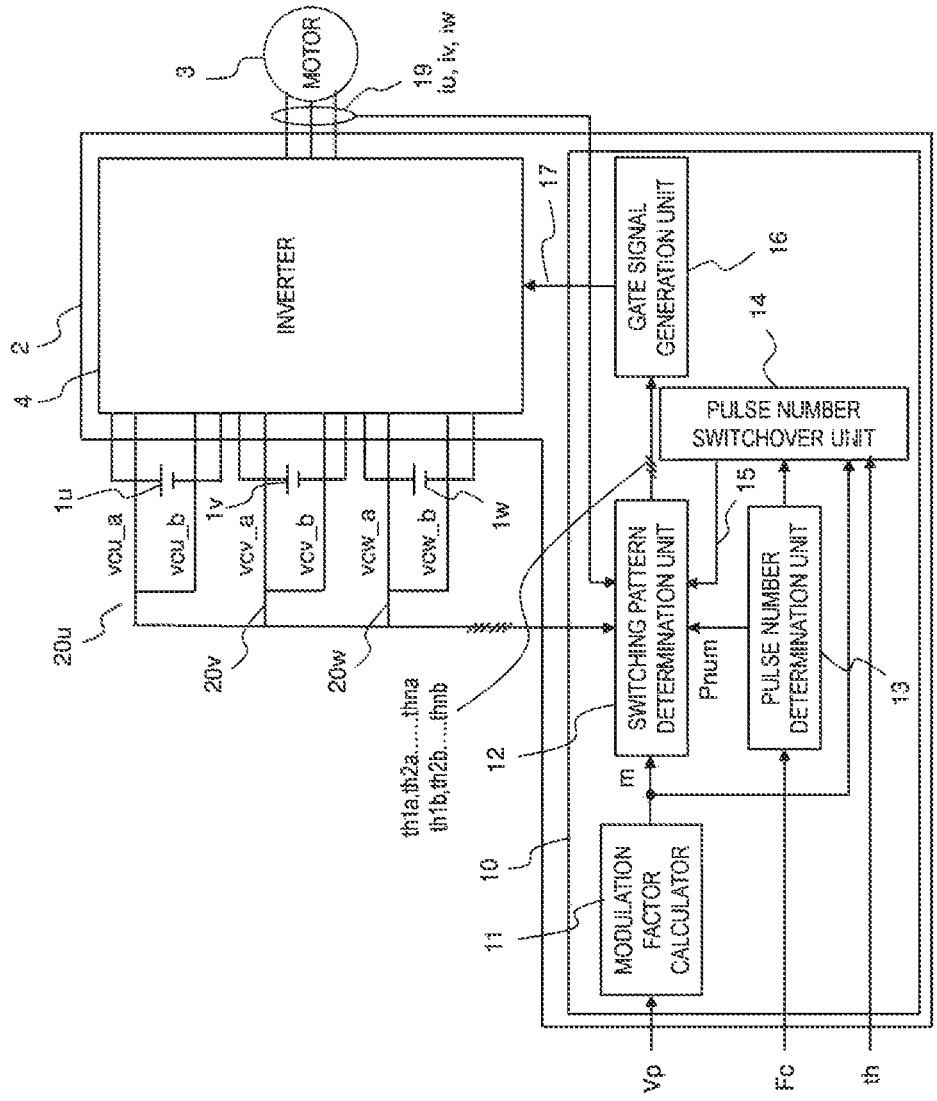
FIG. 1 is a block diagram showing the entire configuration of a power conversion device according to embodiment 1.
Figure 2:
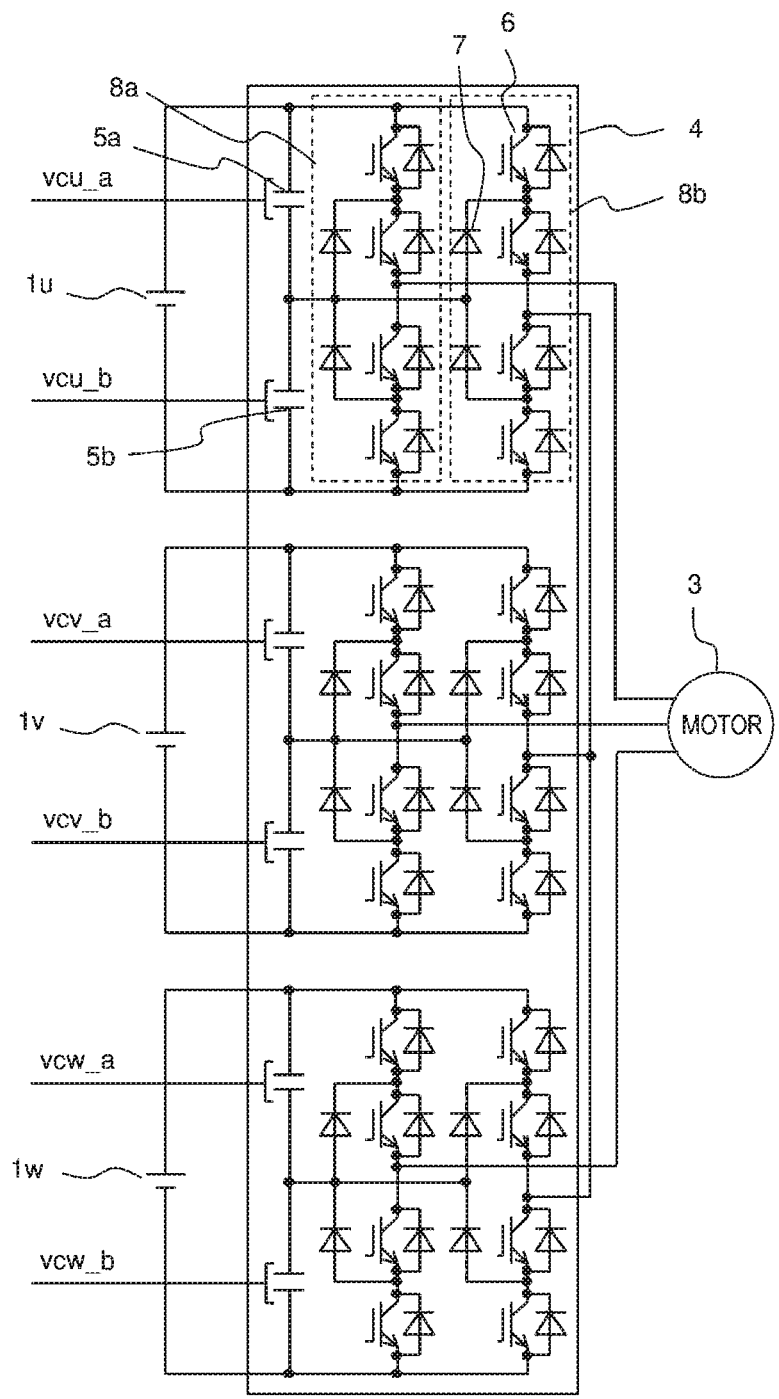
FIG. 2 is a circuit diagram showing an example of an inverter in the power conversion device according to embodiment 1.

FIG. 1 is a block diagram showing the entire configuration of a power conversion device according to embodiment 1. FIG. 2 is a circuit diagram showing an example of an inverter shown in FIG. 1. A power conversion device 2 includes an inverter 4 and a control unit 10 for controlling the inverter 4, and converts DC voltages of DC voltage sources 1u, 1v, 1w for U, V, W phases to variable-voltage variable-frequency AC voltages, to output the AC voltages to a motor 3 which is a load.

Regarding the U phase as an example, as shown in FIG. 2, the inverter 4 is configured as a 5-level inverter formed by connecting, in series, two switching legs 8a and 8b each forming a 3-level inverter of a neutral-point-clamped type provided with two positive-side and negative-side capacitors 5a and 5b connected in series and dividing DC voltage of the DC voltage source 1u, a plurality of switching elements 6 each formed by an IGBT or the like to which a diode is connected in antiparallel, and clamp diodes 7. The inverter 4 has the same configuration also for V phase and W phase.

Under the configuration in which two switching legs 8a and 8b forming 3-level inverters are connected in series for each phase to form a 5-level inverter as described above, a switching pattern and the like will be described below. It is noted that the technology according to the present disclosure is applicable to not only the 5-level inverter but also a 3-level inverter of a neutral-point-clamped type or a multi-stage configuration of 2-level inverters, and the configuration thereof is not necessarily limited to a configuration formed by a series unit of two or more legs. However, the present disclosure is applicable to such an inverter that has, on the DC input side, a series unit of a positive-side capacitor and a negative-side capacitor with their connection point serving as a neutral point, for dividing the inputted DC voltage, and has at least a positive-side potential and a negative-side potential of DC voltage and a neutral point potential as output potentials.

The inverter 4 performs ON/OFF driving of the switching elements 6 through pulse width modulation (PWM) control to convert each DC voltage of the DC voltage sources 1$u$, 1$v$, 1$w$ to AC voltage having desired magnitude and frequency, and outputs the AC voltage. In addition, the inverter 4 is provided with a current sensor as a load current detection unit 19 for detecting current of the motor 3 which is a load current, at a connection part with the motor 3, and neutral point voltage sensors 20$u$, 20$v$, 20$w$ which detect voltages of the positive-side capacitor 5$a$ and the negative-side capacitor 5$b$ provided for each phase and dividing each voltage of the DC voltage sources 1$u$, 1$v$, 1$w$ of the inverter 4, and detect a difference between both voltages as neutral point voltage.

The control unit 10 includes a modulation factor calculator 11, a pulse number determination unit 13, a switching pattern determination unit 12, a pulse number switchover unit 14, and a gate signal generation unit 16. Hereinafter, each of these constituent units will be described. The modulation factor calculator 11 calculates a modulation factor m by Expression (1) on the basis of DC voltage Vdc of the DC voltage sources 1$u$, 1$v$, 1$w$ and an output voltage command value (phase voltage amplitude) Vp for the inverter 4.

$$m=Vp/Vdc \quad (1)$$

The pulse number determination unit 13 determines the type of PWM to be outputted and the number of pulses Pnum per half cycle of the fundamental wave in PWM control, on the basis of an output frequency command value Fc for the inverter 4. In a case where the inverter 4 has elements whose switching speeds are slow as in a large-capacity inverter, the number of times switching can be performed in unit time is limited. Therefore, if the output frequency becomes high, the number of times of switching in one cycle of electric angle decreases. When the number of times of switching in one cycle of electric angle is small, low-order harmonics are increased and torque variation is also increased. Accordingly, in motor driving with a variable frequency, it is necessary to perform switching with decreased harmonics irrespective of the number of times of switching which is limited by the output frequency of the inverter 4.

Figure 3:
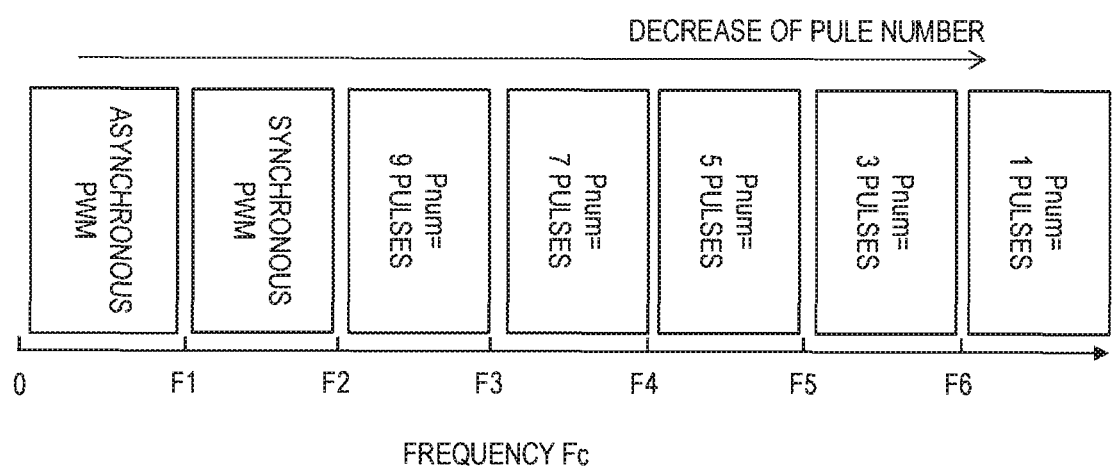
FIG. 3 illustrates operation of a pulse number determination unit in the power conversion device according to embodiment 1.

FIG. 3 illustrates a condition for determining the type of PWM and the number of pulses (number of times of switching) in half cycle of the fundamental wave of the output frequency, in the pulse number determination unit 13 according to the present embodiment 1. In the pulse number determination unit 13, the output frequency is divided into seven regions by six thresholds F1 to F6, and the optimum switching method and the optimum number of times of switching (number of pulses) can be selected in each frequency region.

First, in the region where the output frequency command value Fc is 0 to F1, asynchronous PWM in which a carrier (triangular wave) generated with a fixed frequency is compared with a command value to generate PWM, is selected. When the output frequency is low, the time of one cycle is long, and therefore even with elements having slow switching speeds, switching can be performed a larger number of times in one cycle, so that torque ripple and harmonics are decreased.

When the output frequency command value Fc becomes higher than F1 and thus the number of times of switching in one cycle of electric angle decreases, pulse generation by synchronous PWM in which a carrier (triangular wave) whose frequency is an integer multiple of the output frequency is compared with a command value to generate PWM synchronized with one cycle of electric angle, is selected. In the present embodiment 1, in the region up to the threshold F2, the carrier frequency is set so that the number of pulses is 13 or more.

In the region where the output frequency command value Fc is higher than the threshold F2, low-order harmonic reduction PWM that is synchronized with the output frequency as in the synchronous PWM and reduces low-order harmonics, is outputted. The number of pulses Pnum in half cycle of the fundamental wave is 9 in the region of F2<Fc≤F3, and then is 7 in the region of F3<Fc≤F4. In this way, the number of pulses is decreased in order, and the number of pulses Pnum in half cycle is 1 in the region higher than F6.

When the number of pulses Pnum determined by the pulse number determination unit 13 is changed, the pulse number switchover unit 14 provides a switchover transition period and thus, when the output voltage phase (th) of the inverter 4 becomes a predetermined phase, outputs a switchover command 15 for switching a switching pattern to be read from the switching pattern determination unit 12, to the switching pattern determination unit 12.

In the switching pattern determination unit 12, for each number of pulses Pnum set in advance as shown in, for example, FIG. 3 and for each magnitude of the modulation factor m set in advance, switching patterns for specifying switching phases which are timings of ON/OFF driving the switching elements 6 are obtained in advance through calculation, and then stored for each modulation factor m and each number of pulses Pnum. This calculation is for obtaining such a switching pattern that realizes a required modulation factor m and reduces harmonic components. The switching patterns and the calculation method therefor will be described in detail later.

The gate signal generation unit 16 reads, from the switching pattern determination unit 12, the switching pattern corresponding to the modulation factor m from the modulation factor calculator 11 and the number of pulses Pnum from the pulse number determination unit 13, and generates a gate signal 17 for ON/OFF driving the switching elements 6 on the basis of the switching pattern and the output voltage phase (th).

Figure 4:
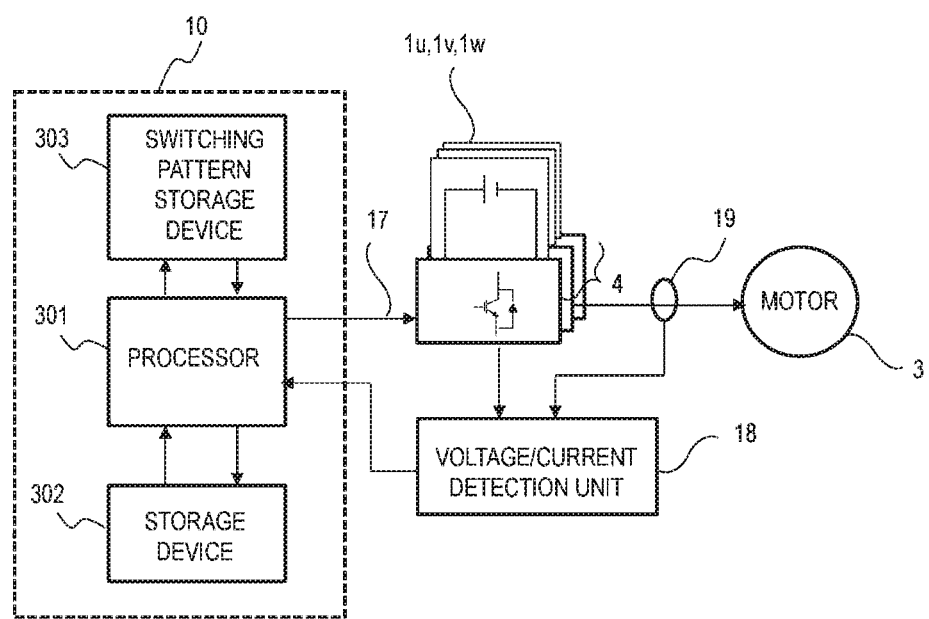
FIG. 4 is a block diagram showing the hardware configuration of the power conversion device according to embodiment 1.

FIG. 4 is a block diagram showing the hardware configuration of the power conversion device 2. The control unit 10 includes a processor 301, a storage device 302, and a switching pattern storage device 303, as hardware. The storage device 302 stores a program of the control unit 10 in advance. The processor 301 executes a function program stored in the storage device 302. The modulation factor calculator 11, the switching pattern determination unit 12, the pulse number determination unit 13, the pulse number switchover unit 14, and the gate signal generation unit 16 in the control unit 10 are implemented by the processor 301. The switching pattern storage device 303 stores the switching pattern determined by the switching pattern determination unit 12 in accordance with the program executed by the processor 301, and may store the switching pattern during execution of the function program or at the time of start-up.

As shown in FIG. 4, on the basis of information from a voltage/current detection unit 18 which is the sensors (19, 20u, 20v, 20w) for detecting voltages and currents at various parts of the inverter 4, the gate signal 17 for ON/OFF driving the switching elements 6 of the inverter 4 is generated through calculation processing by the processor 301.

Next, operation will be described. Operation of the inverter 4 itself based on ON/OFF driving of the switching elements 6 is well known and therefore the description thereof is omitted. Here, the control unit 10, in particular, the switching pattern and the switching pattern calculation method by the switching pattern determination unit 12, which are important in the present disclosure, will be mainly described.

Figure 5:
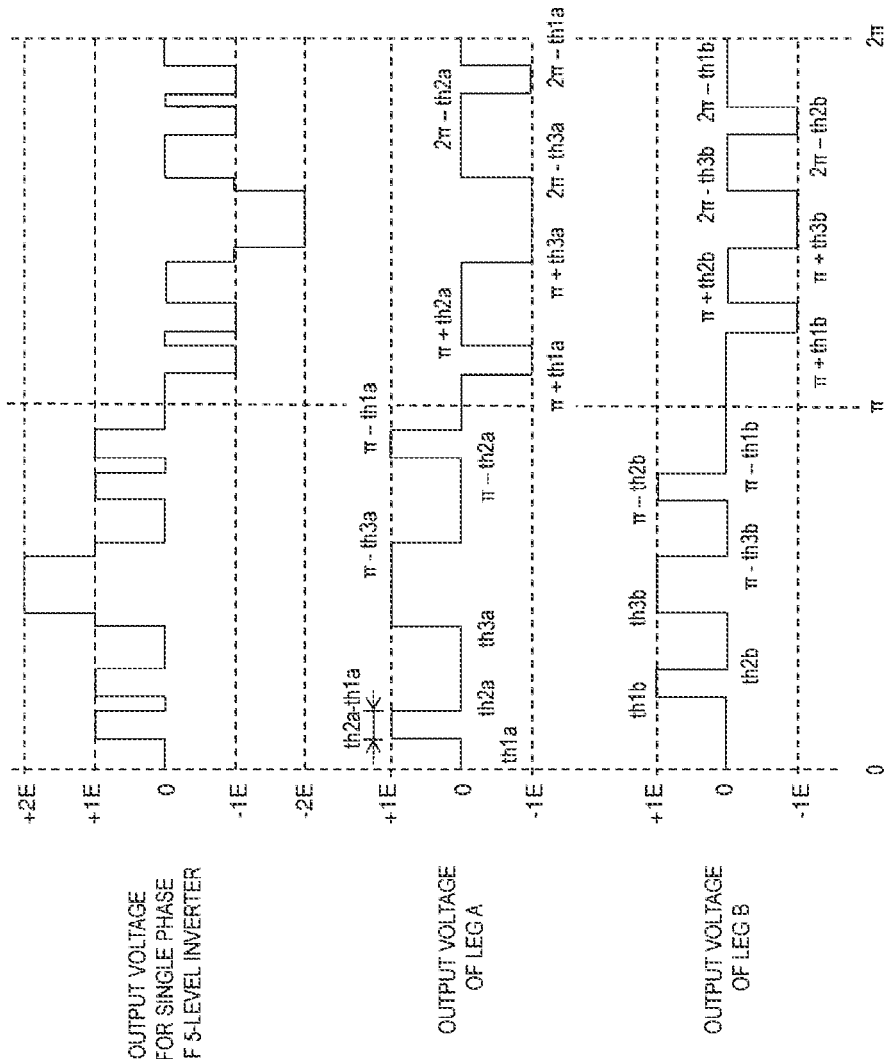
FIG. 5 is a chart schematically showing examples of output voltage waveforms at several parts of the inverter in the power conversion device according to embodiment 1.

FIG. 5 schematically shows the relationship between an output voltage waveform for a single phase of the 5-level inverter 4 and output voltage waveforms of the two switching legs 8a (hereafter, referred to as leg A) and 8b (hereafter, referred to as leg B) connected in series, in a case where the number of pulses Pnum is 3. FIG. 5 shows pulse voltage waveforms for one cycle ($2\pi$), and the output voltages of the two legs A and B are summed to be the output voltage waveform for a single phase of the 5-level inverter that operates with the total number of pulses=Pnum (3)×the number of leg series stages (2)=6, as shown at the uppermost stage in FIG. 5. It is noted that the respective voltages are shown with the voltage of the DC voltage source defined as 2E.

In accordance with the need for ensuring symmetry between positive and negative waveforms, as shown in FIG. 5, the switching phases which are timings of turning on or off the switching elements 6 are determined at th1a, th2a, and th3a for the leg A and th1b, th2b, and th3b for the leg B, whereby the respective output waveforms and therefore the output voltage waveform of the 5-level inverter are determined. That is, the switching pattern specifies these six switching phases th1a, th2a, th3a, th1b, th2b, th3b, and the output voltage waveform of the inverter 4 is specified by the switching pattern.

Here, for facilitating the understanding of the configuration and operation of the switching pattern determination unit 12 for obtaining the switching pattern in the present disclosure, first, the method in Patent Document 1 cited and shown in the above problem section will be described as Comparative example 1. In Patent Document 1, description based on a drawing showing a control configuration is not particularly given, but here, for clear comparison between the present disclosure and the comparative example, the comparative example will be described intentionally on the basis of FIG. 5 created under the assumption of the control configuration corresponding to the switching pattern determination unit 12 of the present disclosure.

Here, in the switching pattern determination unit 12 for obtaining switching patterns for reducing low-order harmonics as described in Patent Document 1 or Patent Document 2, a switching pattern that is a switching phase group for ensuring a modulation factor amplitude and reducing harmonics for specific orders is calculated using an expression representing the amplitude of the output voltage fundamental wave and the amplitudes of frequency components corresponding to integer multiples thereof with trigonometric functions and switching phases (0 to $2\pi$ (rad)) by Fourier series while performing frequency transform of a time-series switching pattern determined by the number of pulses, the modulation factor, and the output frequency.

Next, a method for defining the frequency and the amplitude of a voltage waveform outputted through switching using Fourier series, will be described. The output voltage waveforms outputted by the respective switching legs are 120°-symmetric among the phases and have symmetry per ¼ cycle and per ½ cycle, irrespective of the number of pulses. Therefore, only harmonic voltages for integer orders are contained, and harmonic voltages for even-number orders and the third order do not occur in theory. Thus, where the order of the fundamental wave is defined as 1 and the order of a harmonic that occurs is denoted by n, the order n is represented as n=6h±1 (h is an integer not less than 1). Accordingly, the order n takes values as follows.

5, 7, 11, 13, 17, 19, 23, 25, 29, 31, 35, 37, . . .

For example, in a case of calculating a switching pattern that enables ensuring the modulation factor m and eliminating harmonic components for fifth, seventh, eleventh, and thirteenth orders with the number of pulses Pnum=3 as shown in FIG. 5, simultaneous equations represented by Expression (2) are used. This expression is the same as Expression (4) Patent Document 1.

$$\begin{aligned}
&\frac{4}{\pi}(\cos th1a - \cos th2a + \cos th3a) = m \\
&\frac{4}{\pi}(\cos th1b - \cos th2b + \cos th3b) = m \\
&\cos 5th\,1a - \cos 5th2a + \cos 5th3a + \cos 5th1b - \cos 5th2b + \cos 5th3b = 0 \\
&\cos 7th\,1a - \cos 7th2a + \cos 7th3a + \cos 7th1b - \cos 7th2b + \cos 7th3b = 0 \\
&\cos 11th\,1a - \cos 11th2a + \cos 11th3a + \cos 11th1b - \cos 11th2b + \cos 11th3b = 0 \\
&\cos 13th\,1a - \cos 13th2a + \cos 13th3a + \cos 13th1b - \cos 13th2b + \cos 13th3b = 0
\end{aligned} \quad (2)$$

In Expression (2), the first stage is an equation prescribing the relationship between the switching phases th1a, th2a, th3a for the leg A and the modulation factor m, and the second stage is an equation prescribing the relationship between the switching phase th1b, th2b, th3b for the leg B and the modulation factor m.

Further, from the number of pulses and the number of stages of the switching legs per one phase of the inverter 4, the number of switching phases to be given in half cycle of the fundamental wave of the output voltage is calculated, and the number of order kinds of harmonics that can be eliminated is determined. Here, the number of switching phases is the total number of pulses=the number of pulses Pnum×2 stages=6, and the number of degrees of freedom in the simultaneous equations is 6.

In the equations at the first and second stages of Expression (2), allocation of the modulation factor (fundamental wave amplitude) is set on a stage number basis of the switching legs so that voltage amplitudes to be outputted by the leg A and the leg B are equally allocated. Therefore, the number of order kinds of harmonics that can be eliminated is 6−2=4.

Accordingly, the equations at the third to sixth stages of Expression (2) are set such that four harmonic components for fifth, seventh, eleventh, and thirteenth orders sequentially from the lowest order are zero. By solving the simultaneous equations with six unknowns composed of the equations at the first and second stages of Expression (2) for equally allocating the fundamental wave amplitude represented by the modulation factor between the leg A and the leg B, and the equations at the third to sixth stages of Expression (2) for making four harmonic components for fifth, seventh, eleventh, and thirteenth orders from the lowest order be zero, six variables that specify a switching pattern, i.e., the switching phases (th1a to th3b) are calculated.

Figure 6A:
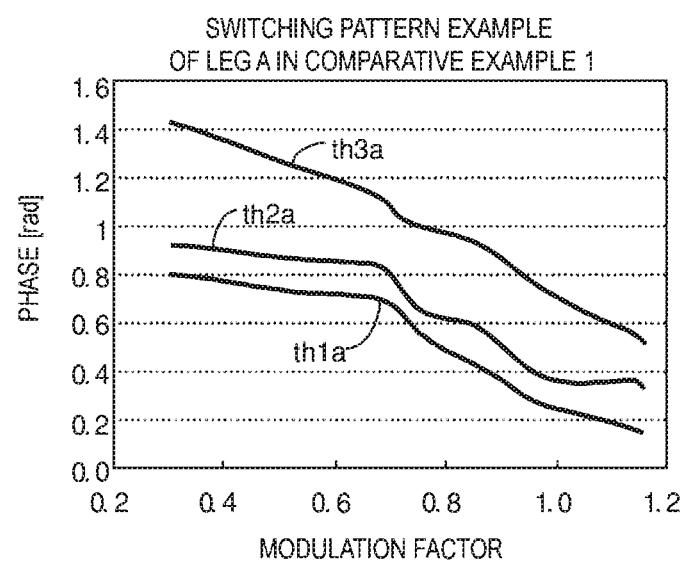
FIG. 6A and FIG. 6B show examples of switching patterns of switching legs in Comparative example 1.
Figure 6B:
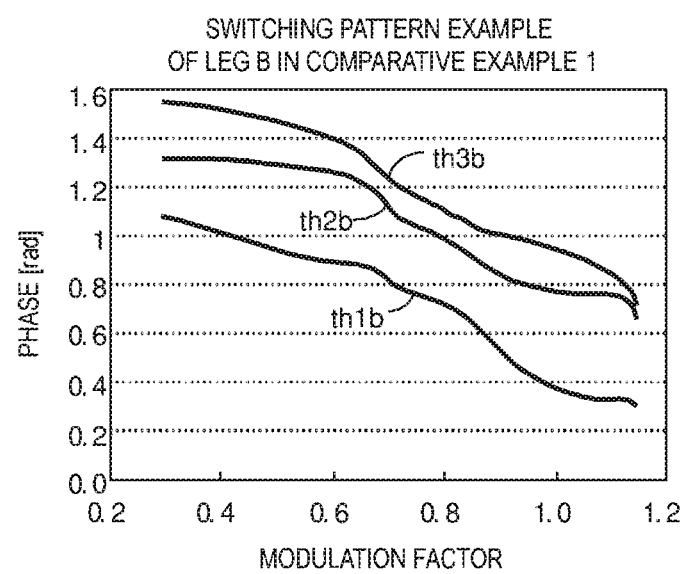
Figure 7A:
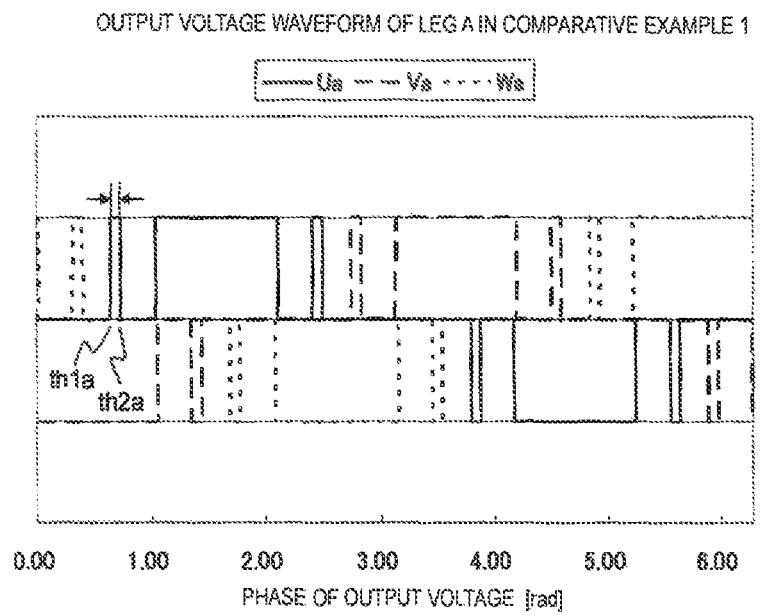
FIG. 7A and FIG. 7B show examples of output voltage waveforms of the switching legs for respective phases in Comparative example 1.
Figure 7B:
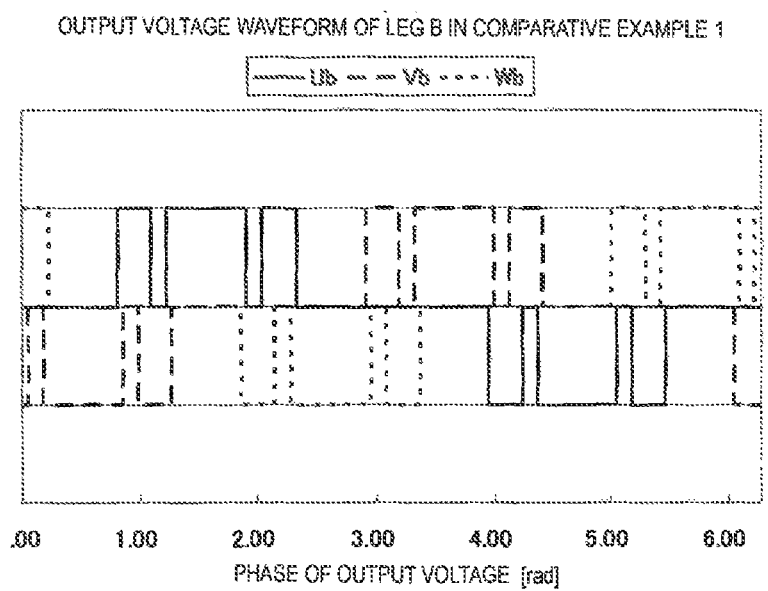

FIG. 6A and FIG. 6B show examples of switching patterns calculated by the above Expression (2), as switching phases in Comparative example 1. It is noted that, for the modulation factor m, calculation is performed on a 0.01-scale basis and linear interpolation is made between respective values. FIG. 7A and FIG. 7B show output voltage waveforms of the 3-level inverters of the leg A and the leg B for each phase in a case where the modulation factor is 0.72. In FIG. 7A, the interval between the adjacent switching phases th1a and th2a, i.e., the pulse width for the leg A is as short as 0.082 rad, and therefore GTOs or the like used as the switching elements of a large-capacity inverter cannot follow switching, resulting in great distortion of the output voltage.

Considering the above, as shown by Expression (5) in Patent Document 1, which is shown as the following Expression (3), the condition for equalizing allocation between the two legs A and B for ensuring the modulation factor is relaxed to calculate the switching pattern, whereby it is possible to satisfy a condition of the phase difference (th2a−th1a)=thlim while keeping the number of order kinds of harmonics to be eliminated.

therefore the effect of reducing torque ripple during motor driving is high. However, in a case of load operation, the amounts of currents for charging or discharging the positive-side capacitor and the negative-side capacitor dividing the DC voltage are unbalanced. Thus, a voltage difference between the positive side and the negative side is expanded and the neutral point potential changes, so that the output voltage becomes positive-negative asymmetric, resulting in a problem of increasing torque ripple.

In general, in a case of performing load operation of a motor by a 3-or-more-level inverter of a neutral-point-clamped type, the voltage of the positive-side capacitor $5a$ and the voltage of the negative-side capacitor $5b$ on the DC input side are increased/decreased through charging/discharging with neutral point current which is current between the inverter 4 and the connection point (C potential point, neutral point) of the two capacitors on the DC input side. The neutral point current flows when one of the legs of the 3-level switching circuit that outputs phase voltage is turned off for both of the positive (P potential) side and the negative (N potential) side, to output a neutral point potential (C potential) which is the potential at the connection point between the positive-side capacitor $5a$ and the negative-side capacitor $5b$, and one or more of the other legs are turned on for either the positive (P potential) side circuit or the negative (N potential) side circuit so that the circuit output is a P potential (positive potential) or an N potential (negative potential).

This current is ±1 times the phase current, and the sign thereof is determined by ON/OFF combination of each switching circuit. The voltage is positive-negative symmetric, and is left-right symmetric on each of the positive side and the negative side (on the positive side, the 0-degree side and the 180-degree side are symmetric with respect to a phase of 90 degrees, and on the negative side, the 180-degree side and the 360-degree side are symmetric with $$\left. \begin{array}{l} \frac{2}{\pi}(\cos th1a - \cos th2a + \cos th3a + \cos th1b - \cos th2b + \cos th3b) = m \\ \cos 5th\,1a - \cos 5th2a + \cos 5th3a + \cos 5th1b - \cos 5th2b + \cos 5th3b = 0 \\ \cos 7th\,1a - \cos 7th2a + \cos 7th3a + \cos 7th1b - \cos 7th2b + \cos 7th3b = 0 \\ \cos 11th\,1a - \cos 11th2a + \cos 11th3a + \cos 11th1b - \cos 11th2b + \cos 11th3b = 0 \\ \cos 13th\,1a - \cos 13th2a + \cos 13th3a + \cos 13th1b - \cos 13th2b + \cos 13th3b = 0 \\ th2a - th1a = th\,\lim \end{array} \right\} \quad (3)$$

Figure 8A:
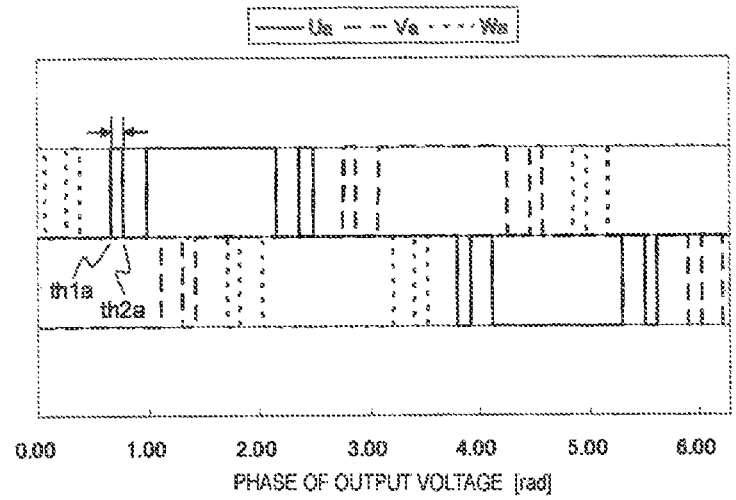
FIG. 8A and FIG. 8B show examples of output voltage waveforms of switching legs for respective phases in Comparative example 2.
Figure 8B:
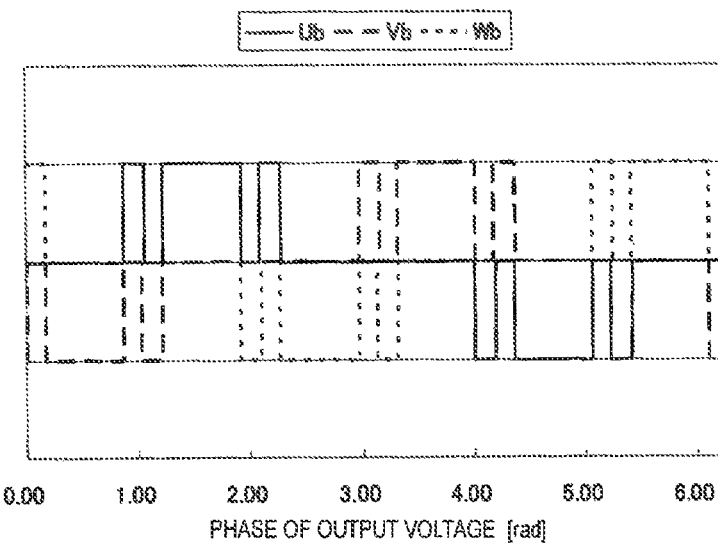
Figure 9A:
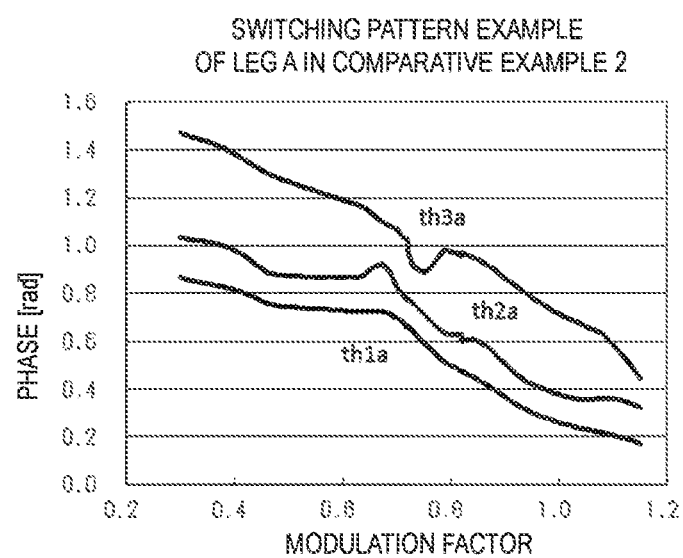
FIG. 9A and FIG. 9B show examples of switching patterns of the switching legs in Comparative example 2.
Figure 9B:
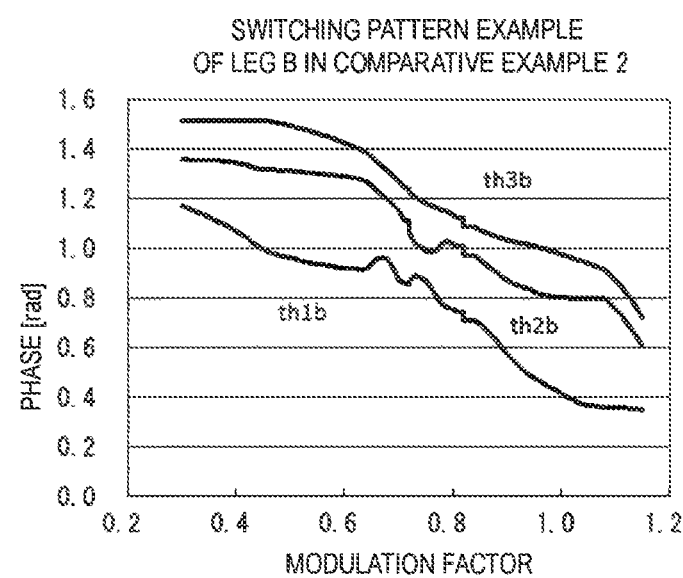

In Expression (3), thlim denotes a pulse width determined in advance depending on the characteristics of the switching elements, and is a pulse width ensured for preventing occurrence of double switching voltage. Here, thlim is set at 0.116 (rad). As a matter of course, the method for calculating the pattern is not limited to the above methods. As Comparative example 2, FIG. 8A and FIG. 8B show output voltage waveforms of the leg A and the leg B with the switching pattern calculated by Expression (3) in a case where the modulation factor is 0.72. It can be confirmed that the interval between the switching phases, i.e., the pulse width (th2a−th1a)=thlim=0.116 rad is ensured, and is greater than the pulse width (th2a−th1a) shown in FIG. 7A. FIG. 9A and FIG. 9B show examples of switching patterns for each modulation factor, calculated by Expression (3) so as to ensure the pulse width (th2a−th1a), as switching pattern examples in Comparative example 2.

The switching patterns calculated as described above in Comparative example 2 can reduce low-order harmonics even with a small number of times of switching, and respect to a phase of 270 degrees), and if the power factor is high so that phase delay of the load current relative to the voltage is small, the neutral point current is also almost positive-negative symmetric, and thus the influence on the capacitor voltage difference is small. However, if the power factor is low as in such a case of driving an induction machine, the load current shifts relative to the output voltage. Thus, the neutral point current which is determined to be positive, negative, or zero depending on the switching state at the time of voltage output no longer has a current waveform that is left-right symmetric and positive-negative symmetric, so that the capacitor voltage difference is expanded due to imbalance between the amounts of currents for charging or discharging the two capacitors.

Figure 10:
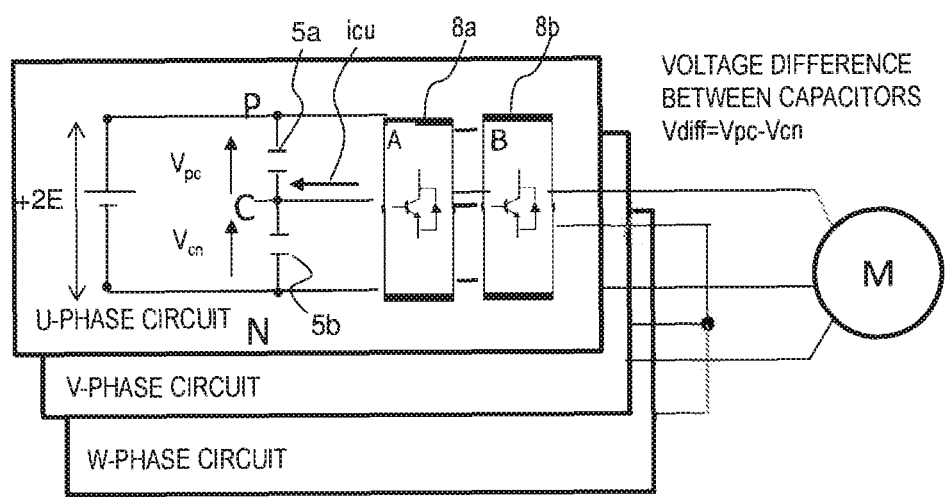
FIG. 10 is a schematic diagram illustrating neutral point current in the power conversion device according to embodiment 1.

FIG. 10 is a schematic diagram showing the circuit of the 5-level inverter in embodiment 1, and the direction and the location of neutral point current icu, the positive potential point (P), the negative potential point (N), and the neutral point (C) on the DC input side formed by the positive-side capacitor $5a$ and the negative-side capacitor $5b$ in the U-phase circuit as a representative. Each switching leg outputs one of the P potential, the N potential, and the C potential. FIG. 11 is a table showing the relationship between combinations of the output potentials of the two switching legs 8a (leg A) and 8b (leg B) in the U-phase circuit of the inverter 4, and the phase voltage outputted from the U-phase circuit and the neutral point current icu. FIG. 12 is a table showing combinations of the output potentials (P, C, N) of the leg A and the leg B when the neutral point current icu flows in the table shown in FIG. 11, the relationship of the neutral point current icu and U-phase current iu at this time, and the increase/decrease relationship of a difference Vdiff between voltage Vpc of the positive-side capacitor 5a and voltage Vcn of the negative-side capacitor 5b.

As shown in the tables in FIG. 11 and FIG. 12, in the U-phase circuit, when one of the leg A and the leg B outputs the C potential and the other one outputs the P potential or the N potential, and the single-phase output voltage is ±1E which is half the DC voltage 2E, the neutral point current icu flows. When the leg B outputs the C potential, the direction of icu is the same (+1 times) as the U-phase current iu, and when the leg A outputs the C potential, the direction of icu is opposite (−1 times) to the U-phase current iu.

As shown in FIG. 12, the difference Vdiff=Vpc−Vcn between the voltage of the positive-side capacitor 5a on the DC input side, i.e., P-C voltage Vpc, and the voltage of the negative-side capacitor 5b, i.e., C-N voltage Vcn, decreases through discharging of the positive-side capacitor 5a or charging of the negative-side capacitor 5b when the neutral point current icu is positive, and the difference Vdiff increases through charging of the positive-side capacitor 5a or discharging of the negative-side capacitor 5b when the neutral point current icu is negative. Which of the positive-side capacitor 5a and the negative-side capacitor 5b is charged or discharged depends of whether one of the two switching legs outputs P-potential voltage or N-potential voltage.

Figure 13:
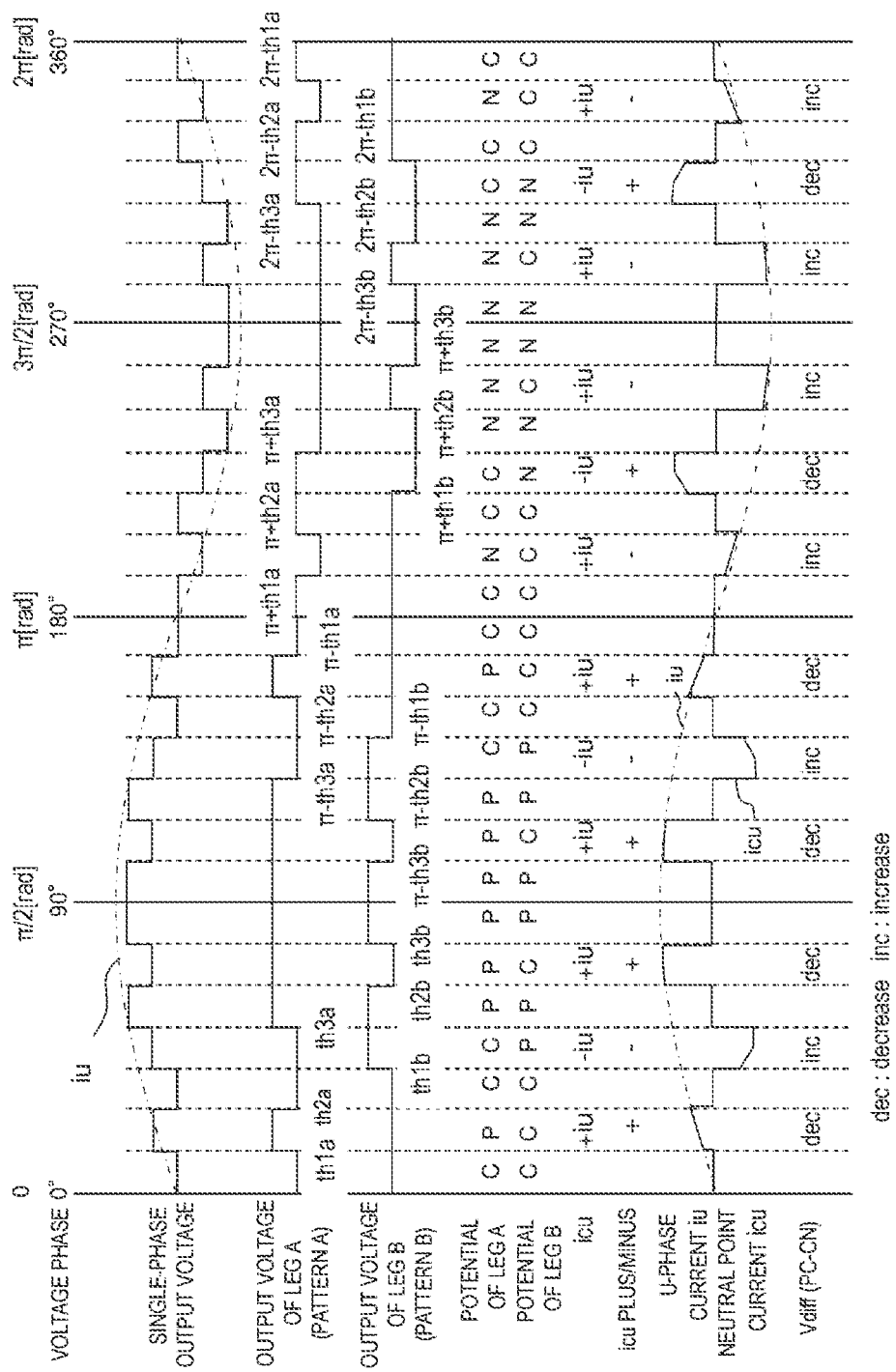
FIG. 13 is a time chart showing an example of operation of the power conversion device according to embodiment 1.

FIG. 13 is a time chart showing an example of operation corresponding to the tables in FIG. 11 and FIG. 12, over one cycle of the fundamental wave (voltage phase: 0° to 360° (0 to 2π rad)). FIG. 13 shows an example of operation for U phase of the 5-level inverter for reducing low-order harmonics in a case where the number of pulses Pnum is 3. The 5-level U-phase PWM voltage is obtained by combining the 3-level output voltage of the leg A generated by the switching phases th1a, th2a, th3a and the 3-level output voltage of the leg B generated by the switching phase th1b, th2b, th3b. Meanwhile, regarding the load current (U-phase current iu) detected by the current sensor 19, if the load current is controlled at a power factor of 1 and thus has no phase delay relative to the voltage, as shown in FIG. 13, when only either the leg A or the leg B is turned on and the other leg outputs the C potential, the neutral point current icu flows, and the value thereof is +1 times the phase current when the output of the leg B is the C potential, and is −1 times the phase current when the output of the leg A is the C potential.

First, as shown in FIG. 13, in a range where the voltage phase is 0° to 180°, the single-phase output voltage is positive, and in a combination where the output of the leg A is the P potential and the output of the leg B is the C potential, the sign of the neutral point current flowing into the neutral point is the same as the U-phase current, i.e., positive. On the other hand, when the output of the leg A is the C potential and the output of the leg B is the P potential, the neutral point current icu is −1 times the U-phase current and thus is negative. When the output of the leg A is the P potential and the output of the leg B is the C potential so that the neutral point current icu is greater than 0, the positive-side capacitor 5a is discharged and the capacitor voltage difference Vdiff decreases. On the other hand, when the output of the leg A is the C potential and the output of the leg B is the P potential so that the neutral point current icu is smaller than 0, the positive-side capacitor 5a is charged and Vdiff increases. To describe increase/decrease in the capacitor voltages using the switching phases th1a to th3a, th1b to th3b, the capacitor voltage difference Vdiff decreases in switching phase regions th2a-th1a and th3b-th2b, and increases in a switching phase region th3a-th1b. For a range of 90° to 180°, the operation is symmetric with a range of 0° to 90° with respect to 90°.

In a range where the voltage phase is 180° to 360°, the U-phase output voltage and the U-phase current are negative, and in a combination where the output of the leg A is the N potential and the output of the leg B is the C potential, the neutral point current is negative as with the U phase. At this time, since the neutral point current icu is smaller than 0, the negative-side capacitor 5b is discharged and the capacitor voltage difference Vdiff increases. Similarly, in a case where the output of the leg A is the C potential and the output of the leg B is the N potential, the neutral point current icu is −1 times the U-phase current iu and thus icu is greater than 0, so that the negative-side capacitor 5b is charged and the capacitor voltage difference Vdiff decreases. Therefore, in the case of the voltage phase of 180° to 270°, the capacitor voltage difference Vdiff increases in switching phase regions (π+th2a)−(π+th1a) and (π+th3b)−(π+th2b), and decreases in a region (π+th3a)−(π+th1b). For a range of 270° to 360°, the operation is symmetric with a range of 180° to 270° with respect to 270°.

If the power factor is high and the current is positive-negative symmetric and left-right symmetric on the positive side and the negative side, there is almost no increase/decrease of the capacitor voltage difference in one cycle of electric angle, and thus the capacitor voltage difference is kept small. However, if the power factor is low, the current phase is delayed relative to the voltage, so that the positive/negative signs of the voltage and the load current become different around voltage phases of 0° and 180°. Thus, the neutral point current no longer has left-right symmetry on each of the positive side and the negative side of the output voltage. In addition, if the control cycle is short and the frequency and the modulation factor are changed in one cycle of electric angle, the current itself becomes positive-negative asymmetric, so that some capacitor voltage difference arises in one cycle. In particular, in a case where a difference between the phase widths of the switching phase region where the capacitor voltage difference Vdiff increases and the switching phase region where the capacitor voltage difference Vdiff decreases is great, if the current is positive-negative asymmetric and left-right asymmetric and the power factor thereof is low, the capacitor voltage difference Vdiff is expanded due to the asymmetry of the current and imbalance between the phase widths of the switching phase regions where Vdiff increases and decreases.

Figure 17:
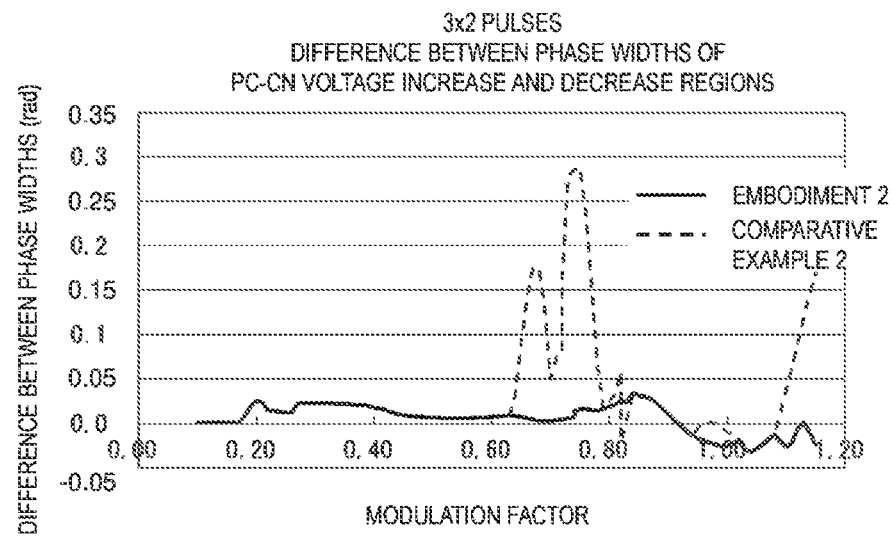
FIG. 17 is a graph showing an example of operation of the power conversion device according to embodiment 2, together with an operation example of a power conversion device in Comparative example 2.

Here, regarding the switching patterns of 3 pulses×2 in FIG. 9A and FIG. 9B derived by Expression (3) shown as Comparative example 2, a difference between the phase widths of the switching phase regions where Vdiff increases and decreases, i.e., a difference between the sum of the switching phase regions th1b−th1a and th3b−th2b, and the switching phase region th3a−th1b, is calculated for each modulation factor, and these differences are shown by a dotted-line graph in FIG. 17 over the modulation factor range of 0.1 to 1.2 on a 0.01-scale basis. As shown by the dotted-line graph in FIG. 17, when the modulation factor is 0.6 or greater, the difference between the phase widths of the switching phase region where the capacitor voltage difference decreases and the switching phase region where the capacitor voltage difference increases, becomes significantly great.

Figure 18:
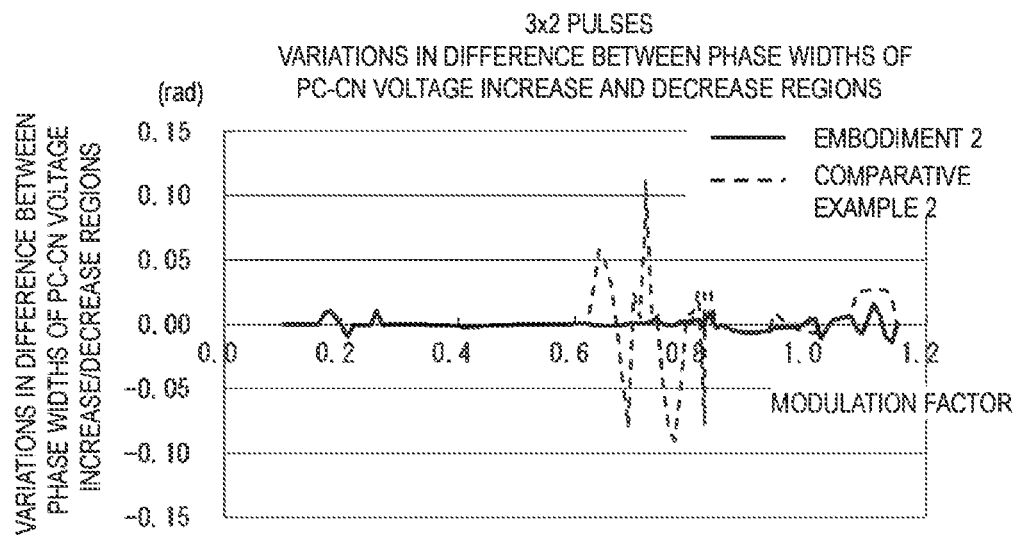
FIG. 18 is another graph showing an example of operation of the power conversion device according to embodiment 2, together with an operation example of the power conversion device in Comparative example 2.

The difference between the phase widths of the switching phase regions where Vdiff increases and decreases in Comparative example 2 shown by the dotted-line graph in FIG. 17, greatly varies with just slight variation of the modulation factor. A dotted-line graph in FIG. 18 shows, on a 0.01-scale basis of modulation factor, variation in the difference between the phase widths of the switching phase region where the capacitor voltage difference Vdiff decreases and the switching phase region where the capacitor voltage difference Vdiff increases, in the case of 3×2 pulses in Comparative example 2. It is found that, in a middle/high modulation factor range, the difference between the phase widths of the above increase and decrease regions greatly varies on a 0.01-scale basis of modulation factor. Accordingly, in such a modulation factor range, it is found that, during load operation, if the power factor is low, the difference between the phase widths of the switching phase regions which cause an influence of increasing/decreasing the capacitor voltage difference greatly varies even with slight variation of the modulation factor, under normal control, and thus the operation is likely to be unbalanced.

In order to avoid such a problem, i.e., in order that the voltage of the positive-side capacitor $5a$ and the voltage of the negative-side capacitor $5b$ are balanced, it is necessary to, in low-order harmonic reduction PWM, set the switching phases so as to not only reduce harmonics and ensure the minimum pulse width required for switching but also ensure that the difference between the phase widths of the region where the capacitor voltage difference increases and the region where the capacitor voltage difference decreases becomes smaller than a predetermined threshold. Hereinafter, in contrast to Comparative example 2, the power conversion device according to embodiment 1 of the present disclosure for balancing the voltage of the positive-side capacitor $5a$ and voltage of the negative-side capacitor $5b$ will be described. Here, a method for balancing the capacitor voltages on the basis of the method described in Patent Document 1 is discussed. With respect to Expression (3), one of the conditions for harmonics is canceled, and a switching phase difference condition, i.e., th2a−th1a=thlim, and a condition for prescribing the difference between the phase widths of the Vdiff increase and decrease regions, i.e., |th2a−th1a+th3b−th2b−(th3a−th1b)|≤thlim_sa, are established.

tal wave amplitude is only the equation at the first stage, and the equations at the second to fourth stages are equations for making harmonic components for three kinds of orders, i.e., fifth, seventh, and eleventh orders, be zero. In addition, the equation at the fifth stage is an equation for ensuring the pulse width thlim set in advance depending on the characteristics of the switching elements, for the pulse outputted by the leg A, and the equation at the sixth stage is an equation for ensuring that the difference between the phase widths of the switching phase region where the capacitor voltage difference Vdiff on the DC input side increases and the switching phase region where the capacitor voltage difference Vdiff decreases becomes equal to or smaller than a predetermined value thlim_sa. By solving these simultaneous equations with six unknowns, six switching phases (th1a to th3b) are calculated.

In the switching pattern determination unit 12, the calculation of Expression (4) is performed, and for example, for each modulation factor m, the switching pattern is calculated and stored. At the time of operating the power conversion device, for example, the switching pattern is read on the basis of the modulation factor m calculated from the output voltage command Vp and the voltage Vdc of the DC voltage source in the modulation factor calculator 11, and the gate signal 17 for each switching element is generated using the read switching pattern, in the gate signal generation unit 16. The generated gate signal 17 is sent to the inverter 4 to ON/OFF drive the switching elements, whereby it is possible to realize such an operation that the voltage difference between the positive-side capacitor and the negative-side capacitor is not expanded and specific three kinds of harmonic components for fifth, seventh, and eleventh orders are reduced.

In the above description, the case where the number of pulses Pnum is 3 has been shown as an example. However, in the switching pattern determination unit 12, also for other predetermined pulse numbers, the number of switching phases included in a switching pattern is determined in accordance with each number of pulses, to calculate the switching pattern, and thus the switching patterns are stored for each number of pulses Pnum in a predetermined range, over a predetermined range of modulation factors m. At the time of operating the power conversion device, the switching pattern corresponding to the number of pulses Pnum determined in the pulse number determination unit 13 and the modulation factor m calculated in the modulation factor calculator 11 can be read from the switching pattern determination unit 12, and the gate signal for ON/OFF driving each switching element 6 can be generated in the gate signal generation unit 16.

$$\left.\begin{array}{l}\frac{2}{\pi}(\cos th1a - \cos th2a + \cos th3a + \cos th1b - \cos th2b + \cos th3b) = m \\ \cos 5th\,1a - \cos 5th2a + \cos 5th3a + \cos 5th1b - \cos 5th2b + \cos 5th3b = 0 \\ \cos 7th\,1a - \cos 7th2a + \cos 7th3a + \cos 7th1b - \cos 7th2b + \cos 7th3b = 0 \\ \cos 11th\,1a - \cos 11th2a + \cos 11th3a + \cos 11th1b - \cos 11th2b + \cos 11th3b = 0 \\ th2a - th1a = th\,\lim \\ |(th2a - th1a) + (th3b - th2b) - (th1b - th3a)| \le th\,\lim\_sa \end{array}\right\} \quad (4)$$

In Expression (4), as compared to Expression (2), the condition for equalizing allocation of the fundamental wave amplitude between the two switching legs A and B, and the condition for eliminating a thirteenth-order harmonic, are canceled. Therefore, an equation for defining the fundamen- As described above, in the power conversion device according to embodiment 1, the switching pattern determination unit 12 performs calculation, for each modulation factor in a predetermined range and each number of pulses Pnum in a predetermined range, so as to satisfy conditions for ensuring the modulation factor, eliminating harmonic components for the respective orders of the output voltage of the inverter, ensuring that the phase difference between predetermined adjacent switching phases becomes equal to or greater than a predetermined value, and ensuring that, regarding switching phase regions where current flows from the inverter to the neutral point in half cycle of the fundamental wave, the difference between the phase widths of the region where the voltage difference between the positive-side capacitor and the negative-side capacitor increases and the region where the voltage difference decreases becomes equal to or smaller than a predetermined value, thereby determining the switching pattern. Thus, it is possible to, while reducing harmonics for several orders, suppress expansion of the difference between voltage of the positive-side capacitor $5a$ and voltage of the negative-side capacitor $5b$, thereby balancing both voltages.

Embodiment 2

In the case of obtaining a switching pattern through calculation by Expression (4) on the basis of the method described in Patent Document 1, the degrees of freedom are determined by the number of switching phases. Therefore, in order to add an equation for establishing a condition about the difference between the phase widths of the switching phase regions which cause an influence on the capacitor voltage difference Vdiff, or the like, one of the degrees of freedom needs to be given to the added condition. As a result, the original equation for prescribing the fundamental wave amplitude or a harmonic component needs to be canceled, thus causing a problem of narrowing the range where harmonics can be reduced.

Accordingly, in the present embodiment 2, in order to obtain a switching pattern in which the difference between the phase widths of the switching phase region where the capacitor voltage difference Vdiff increases and the switching phase region where the capacitor voltage difference Vdiff decreases is small so as to balance voltage of the positive-side capacitor $5a$ and voltage of the negative-side capacitor $5b$, simultaneous equations are set so that overall harmonics for up to a higher order than in the case of Expression (4) are reduced. Embodiment 2 proposes a method for, by solving the above simultaneous equations, obtaining such a switching pattern that can reduce harmonic components for more order kinds than the total number of pulses in the output voltage, even with a comparatively small number of pulses Pnum, while the number of order kinds of harmonics to be reduced is not directly limited by the number of pulses.

Specifically, the sum of squares of harmonic components for up to a higher order is defined as a function. Then, this function is combined with a plurality of functions that define constraint conditions such as allocating the fundamental wave amplitude (=modulation factor) prescribed between the leg A and the leg B, ensuring the minimum pulse width thlim that allows switching, and ensuring that the difference between the phase widths of the switching phase region where the capacitor voltage difference Vdiff increases and the switching phase region where the capacitor voltage difference Vdiff decreases becomes the predetermined value thlim_sa, thereby generating an evaluation function. By finding the minimum solution thereof, it is possible to calculate such a switching pattern that reduces harmonics even when the degrees of freedom are limited because of presence of the plurality of constraint condition equations.

Figure 14:
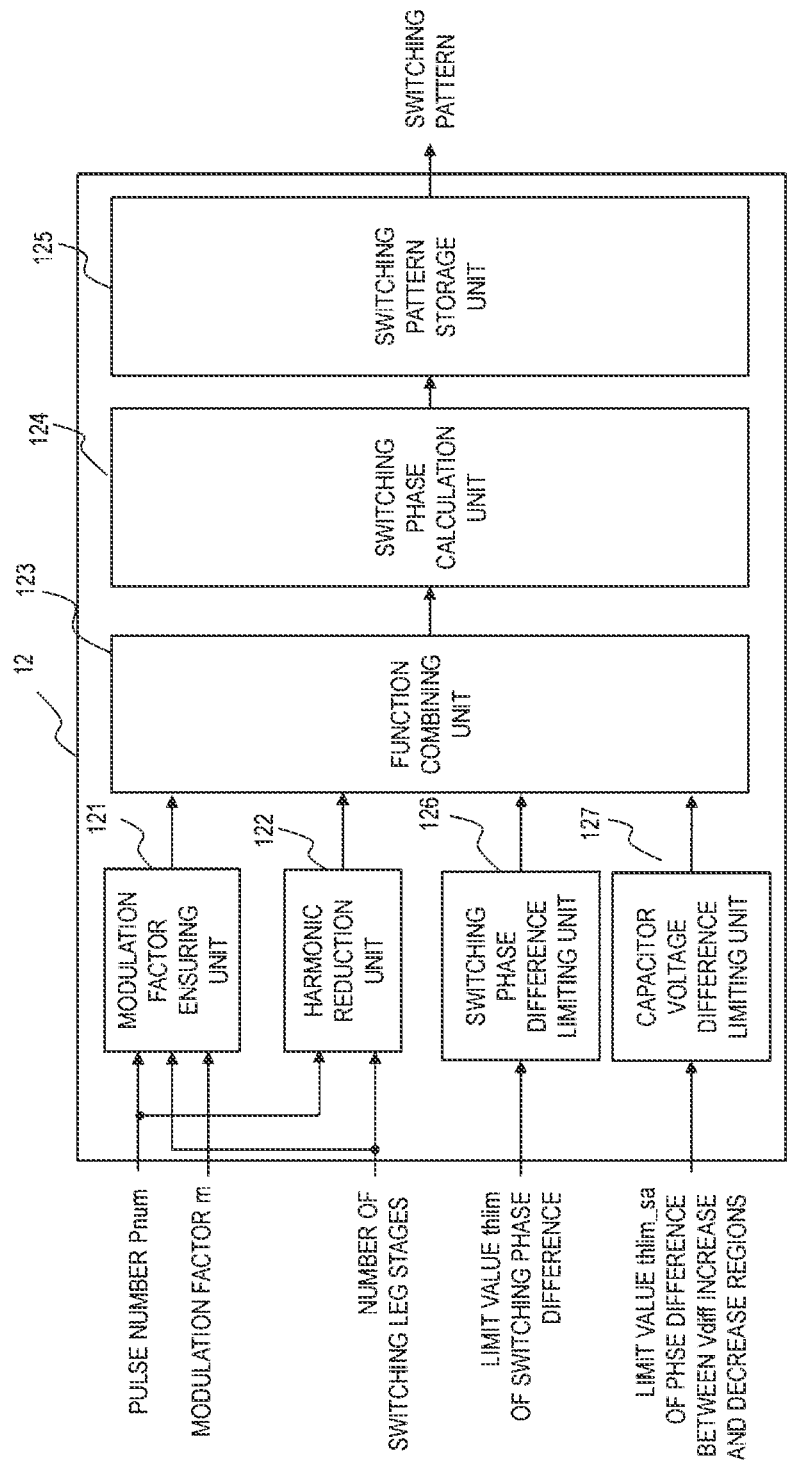
FIG. 14 is a block diagram showing the internal configuration of a switching pattern determination unit in a power conversion device according to embodiment 2.

FIG. 14 shows an internal configuration example of the switching pattern determination unit 12 having the above feature. In FIG. 14, the switching pattern determination unit 12 includes a modulation factor ensuring unit 121, a harmonic reduction unit 122, a function combining unit 123, a switching phase calculation unit 124, a switching pattern storage unit 125, a switching phase difference limiting unit 126, and a capacitor voltage difference limiting unit 127. As shown in FIG. 4, the switching pattern determination unit 12 is implemented by the processor 301, but the switching pattern storage unit 125 in the switching pattern determination unit 12 is implemented by the switching pattern storage device 303.

First, the modulation factor ensuring unit 121 defines a first function f for ensuring the modulation factor and associating the fundamental wave component of the output waveform of the inverter 4 and the modulation factor with each other, on the basis of the modulation factor, the number of pulses, and the number of switching leg stages. Specifically, as shown by Expression (5) and Expression (6), a function f1(th1a, th2a, th3a) and a function f2(th1b, th2b, th3b) which are sub-functions of the first function and prescribe the relationships between the switching phases and the modulation factor, are defined for the leg A (switching leg $8a$) and the leg B (switching leg $8b$), respectively.

Next, as shown by Expression (7), in order to reduce harmonics, the harmonic reduction unit 122 defines a second function Y(thi) with switching phases thi used as variables, for prescribing the relationship between the switching phases thi and the sum of squares of values respectively obtained by multiplying harmonic components for respective orders of the output waveform of the inverter 4 by weighting coefficients w(k) (k=k1 to kj), as a sum value of the harmonic elements for the respective orders. In Expression (7), k denotes the order of each harmonic to be reduced, and here, a total of eight kinds of orders, i.e., fifth, . . . , twenty-fifth orders are targeted. However, the reduction targets are not limited thereto. In a case of uniformly reducing every harmonic, the weighting coefficients w(k) are all 1, but in a case of more reducing specific orders, the weighting coefficients w(k) may be changed in accordance with such orders.

In addition to the above, as shown by Expression (8), the switching phase difference limiting unit 126 sets a third function P for prescribing the phase difference between the adjacent switching phases th1a and th2a, in order to set the lower limit value (thlim) for the switching phase difference.

Further, as shown by Expression (9), the capacitor voltage difference limiting unit 127 sets a fourth function Q for prescribing the difference between the phase widths of the switching phase region where the voltage difference Vdiff between the positive-side capacitor $5a$ and the negative-side capacitor $5b$ increases and the switching phase region where the voltage difference Vdiff decreases, i.e., the difference between the sum of the phase widths (th2a–th1a) and (th3b–th2b), and the phase width (th3a–th1b).

$$f1(th1a, th2a, th3a) = \frac{2}{\pi}(\cos th1a - \cos th2a + \cos th3a) - m \quad (5)$$

$$f2(th1b, th2b, th3b) = \frac{2}{\pi}(\cos th1b - \cos th2b + \cos th3b) - m \quad (6)$$

$$Y(th1a, th2a, th3a, th1b, th2b, th3b)) = \quad (7)$$

-continued $$\sum \left\{ \frac{2}{\pi} \times \frac{1}{k} \binom{\cos k th a - \cos k th 3a + \cos k th 2b -}{\cos k th 2b + \cos k th 3b} \times w(k) \right\}^2$$

$(k = 5, 7, 11, 13, 17, 19, 23, 25)$ $$P(th1a, th2a) = th2a - th1a - thlim \quad (8)$$

$$Q(th1a, th3a, th1b, th2b, th3b) = \quad (9)$$

$$|(th2a - th1a) + (th3b - th2b) - (th3a - th1b)| - th\ \text{lim\_sa}$$

Further, as shown by Expression (10), the function combining unit 123 defines an evaluation function X in which one or more additional variables are added to the degrees of freedom of the first function f and the second function Y (corresponding to the number of switching phases thi as variables, here, six variables), to increase the degrees of freedom, and thus degrees of freedom for the third function P and the fourth function Q are ensured, in order to obtain such switching phases that simultaneously satisfy the conditions for ensuring the modulation factor and the lower limit value (thlim) for the switching phase difference, ensuring that the difference between the phase widths of the switching region where the capacitor voltage difference Vdiff increases and the switching region where the capacitor voltage difference Vdiff decreases does not exceed the upper limit value (thlim_sa), and reducing the sum of squares about harmonic components for respective orders as described above. Specifically, the function combining unit 123 defines an evaluation function X(thi, α1, α2, β, γ) which is the sum of the function Y(thi) shown by Expression (7) and values obtained by multiplying the function f1(th1a, th2a, th3a) shown by Expression (5), the function f2(th1b, th2b, th3b) shown by Expression (6), the function P(th1a, th2a) representing the switching phase difference shown by Expression (8), and the function Q(th1a, th1b, th2b) prescribing the difference between the phase widths of the switching region where Vdiff increases and the switching region where Vdiff decreases, by unknown weighting variables α1, α2, β, γ as additional variables, respectively, and thus the evaluation function X(thi, α1, α2, β, γ) has the switching phases thi and the weighting variable α1, α2, β, γ as variables. In the evaluation function X, the function Y which represents harmonic voltage components may also be multiplied by another additional variable.

$X(th1a,th2a,th3a,th1b,th2b,th3b,\alpha1,\alpha2,\beta,\gamma)=Y(th1a,$
 $th2a,th3a,th1b,th2b,th3b)+\alpha1\times f1(th1a,th2a,$
 $th3a)+\alpha2\times f2(th1b,th2b,th3b)+\beta\times P(th1a,th2a)+\gamma\times$
 $Q(th1a,th2a,th3a,th1b,th2b,th3b)$ (10)

Partial differential of the evaluation function X(thi, α1, α2, β, γ) with respect to ten variables α1, α2, β, γ, and th1a to th3b are taken, and those other than the partial differential for γ are all set to be zero and the partial differential for γ is set to be equal to or smaller than zero, thus establishing simultaneous equations with ten unknowns as shown by Expression (11). These simultaneous equations are solved using Newton's method, for example. That is, calculation for minimizing the evaluation function X is performed. Through this calculation, it is possible to obtain such a switching pattern that ensures the required modulation factor m, minimizes overall values of harmonic voltage components for many orders, and balances the voltage of the positive-side capacitor and the voltage of the negative-side capacitor.

$$\left. \begin{array}{l} \frac{\partial X}{\partial \alpha 1} = 0 \\ \frac{\partial X}{\partial \alpha 2} = 0 \\ \frac{\partial X}{\partial \beta} = 0 \\ \frac{\partial X}{\partial \gamma} \leq 0 \\ \frac{\partial X}{\partial thi} = 0, i = 1a, 2a, 3a, 1b, 2b, 3b \end{array} \right\} \quad (11)$$

By solving the above Expression (11), it is possible to calculate such a switching pattern that equally allocates the required modulation factor m between the two switching legs 8a and 8b, ensures the necessary phase difference thlim between the adjacent two switching phases, ensures that the difference between the phase widths of the switching regions where the voltage difference Vdiff between the positive-side capacitor 5a and the negative-side capacitor 5b increases and decreases during load operation is equal to or smaller than thlim_sa, and minimizes overall values of harmonic voltage components for many orders (in the present embodiment, the highest order is twenty-fifth order, with the number of pulses 3×2).

Figure 15A:
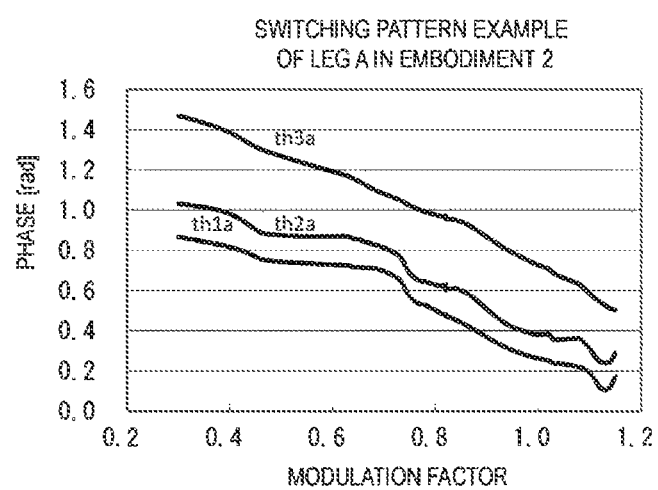
FIG. 15A and FIG. 15B show examples of switching patterns of switching legs according to embodiment 2.
Figure 15B:
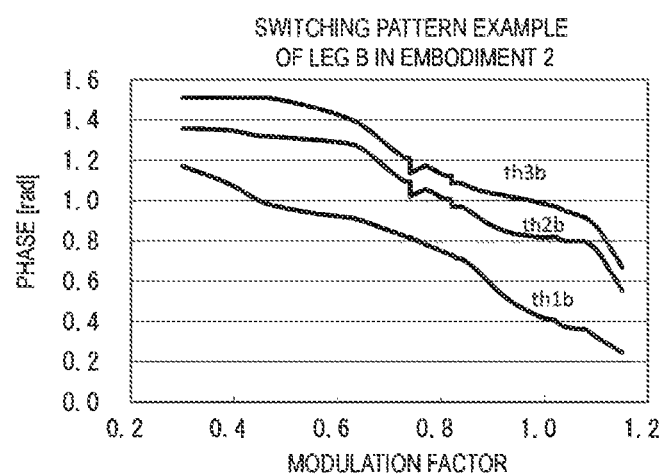

FIG. 15A and FIG. 15B show graphs of switching phases (switching patterns) calculated for each modulation factor as described above. Variations in the switching phases with respect to the modulation factor are smaller and smoother as compared to the switching patterns shown in FIG. 9A and FIG. 9B in Comparative example 2 calculated by the conventional Expression (3).

Figure 16A:
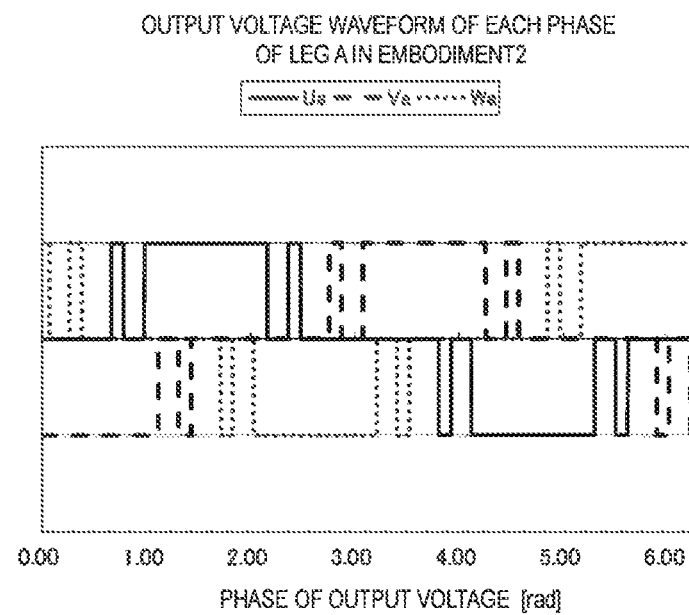
FIG. 16A and FIG. 16B show examples of output voltage waveforms of the switching legs at a modulation factor of 0.72 according to embodiment 2.
Figure 16B:
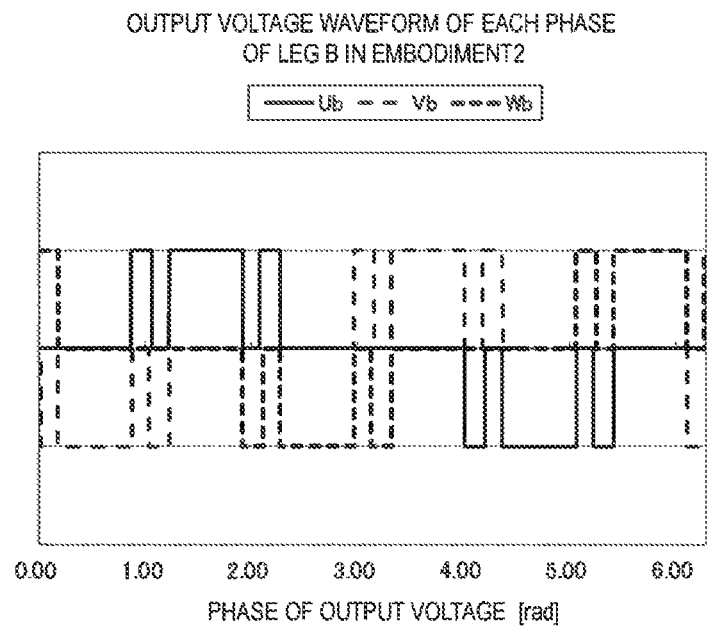

FIG. 16A and FIG. 16B show output voltage waveforms of the two switching legs 8a (leg A) and 8b (leg B) of the 5-level inverter at a modulation factor of 0.72 where the minimum width of the switching phases is ensured, among the switching patterns in FIG. 15A and FIG. 15B derived by solving Expression (11). As shown in FIG. 16A, in the waveform, thlim=0.116 rad is ensured between the switching phases th1a and th2a for the leg A, as in FIG. 8A.

In the pulse patterns of 3 pulses×2 shown in FIG. 15A and FIG. 15B calculated by Expression (11), the difference between the phase widths of the switching phase regions where Vdiff increases and decreases, i.e., the difference between the sum of the switching phase regions th1b–th1a and th3b–th2b, and the switching phase region th3a–th1b, is calculated for each modulation factor, and these differences are shown by solid-line graphs in FIG. 17 and FIG. 18 over the modulation factor range of 0.1 to 1.2 on a 0.01-scale basis. Unlike the dotted-line graphs in Comparative example 2, as shown by the solid line in FIG. 17, the difference between the phase widths of the switching phase regions where Vdiff increases and decreases, i.e., the difference between the increase and decrease region widths is within a range of ±0.05 rad for every modulation factor, and as shown by the solid line in FIG. 18, variation in the difference between the increase and decrease region widths per modulation factor of 0.01 is also less than ±0.02 rad, thus being reduced to be less than ⅙ of the value in the switching pattern of Comparative example 2.

Figure 19:
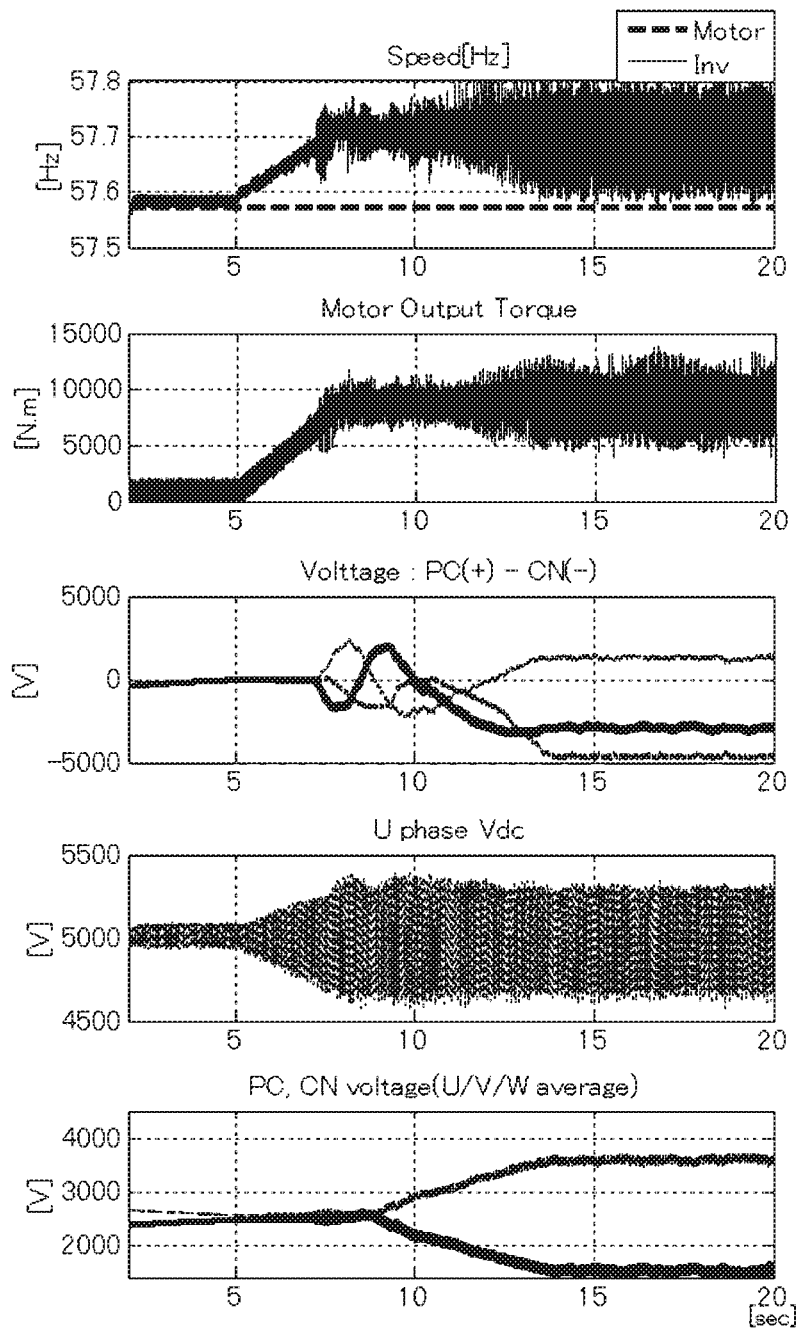
FIG. 19 shows an example of operation of the power conversion device in Comparative example 2.
Figure 20:
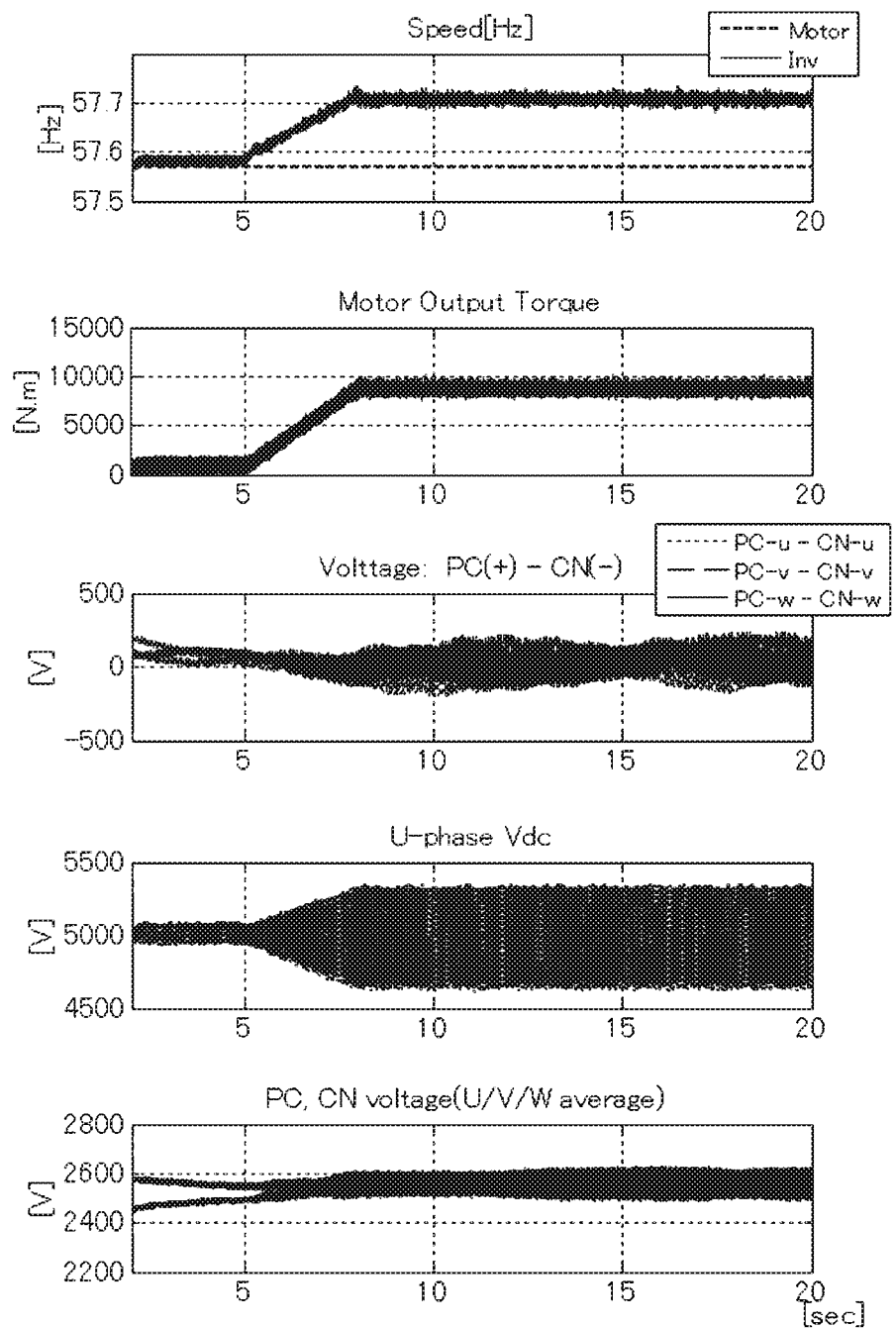
FIG. 20 shows an example of operation of the power conversion device according to embodiment 2.

FIG. 19 and FIG. 20 show waveforms of speeds (inverter and induction motor), motor output torque, the difference (PC−CN) between the positive-side and negative-side capacitor voltages for each phase, the sum (PC+CN) (Vdc) of the positive-side and negative-side capacitor voltages for U phase, and the average values of the positive-side capacitor voltage (PC voltage) and the negative-side capacitor voltage (CN voltage) for each phase, in a case where the pulse patterns in Comparative example 2 shown in FIG. 9A and FIG. 9B and the pulse patterns in embodiment 2 shown in FIG. 15A and FIG. 15B are each stored for a 5-level inverter and an induction motor is driven under the same load and at the same speed. The speed of the induction motor is 57.7 Hz, the modulation factor is 0.72, and the load is increased to 9400 N.m. V/f control is performed for the inverter, and the output voltage command value (Vp) for the inverter is determined as shown by Expression (12).

$$V_p = K_{vf} Fc \tag{12}$$

The output voltage command value (phase voltage amplitude) Vp is represented as the output frequency command value Fc multiplied by a fixed gain Kvf. Vp is given to the inverter 4 as a command for the modulation factor m shown in Expression (1). In the control unit 10, the output frequency command value Fc is corrected using variation in current over time in order to suppress motor torque oscillation, and the frequency Fc slightly varies over time around a modulation factor of 0.72. In the case of using the pulse patterns in Comparative example shown in FIG. 9A and FIG. 9B, when the load increases, the difference Vdiff (=PC−CN) between the positive-side and negative-side capacitor voltages for each phase detected by the neutral point voltage sensors 20u, 20v, 20w greatly increases/decreases as shown in the chart at the third stage in FIG. 19. The rated capacitor voltages on the positive side and the negative side are 2500 V, but the capacitor voltage difference Vdiff is greatly expanded beyond the rated voltage, so that ripple of the motor output torque also becomes great as shown in the chart at the second stage in FIG. 19. On the other hand, in FIG. 20 showing operation in the case of using the pulse patterns shown in FIG. 15A and FIG. 15B calculated by the method disclosed in the present embodiment 2, for example, as shown in the chart at the third stage, the difference (PC−CN) between the positive-side and negative-side capacitor voltages is significantly smaller as compared to the chart at the third stage in FIG. 19, and thus both voltages are balanced, and as shown in the chart at the second stage, variation in motor output torque is also significantly smaller as compared to FIG. 19.

As described above, in designing of low-order harmonic reduction PWM, focusing on the phase widths of the switching phase regions which cause an influence on the difference between the positive-side capacitor voltage and negative-side capacitor voltage on the DC input side, the difference between the phase widths of the switching phase region where the voltage difference Vdiff increases and the switching phase region where the voltage difference Vdiff decreases is set to be small. Thus, it is possible to obtain such PWM that, even in a case where the load is high, the power factor is low, and the current is positive-negative asymmetric, voltages of the positive-side capacitor and the negative-side capacitor are less likely to be unbalanced and torque ripple due to the DC-side circuit can be reduced.

In a case of using such PWM as asynchronous PWM or synchronous PWM in which the switching phases are determined through comparison with the command value, it is difficult to perform phase correction in consideration of the capacitor voltage difference as described above. In general, as a method for reducing the difference between the positive-side and negative-side capacitor voltages in PWM based on triangular wave comparison, DC-component correction is performed for three-phase voltage command values so as to reduce the voltage difference. According to this method, variations in low-order harmonics inevitably increase. On the other hand, the method disclosed in the present embodiment 2 makes it possible to reduce low-order harmonics with a small number of times of switching and reduce the difference between the positive-side and negative-side capacitor voltages without losing the advantage of low-order harmonic reduction PWM.

Embodiment 3

The above embodiments 1 and 2 have shown the method for determining such switching phases that the capacitor voltage difference on the DC input side is less likely to be expanded during load operation, in low-order harmonic reduction PWM in the 5-level inverter in which two 3-level switching legs are connected in series for each phase so as to output 5-level PWM. A similar method can be applied also to a 3-level inverter or a multilevel inverter in which 2-level switching circuits are combined at a plurality of stages so as to output multilevel voltage.

Figure 21:
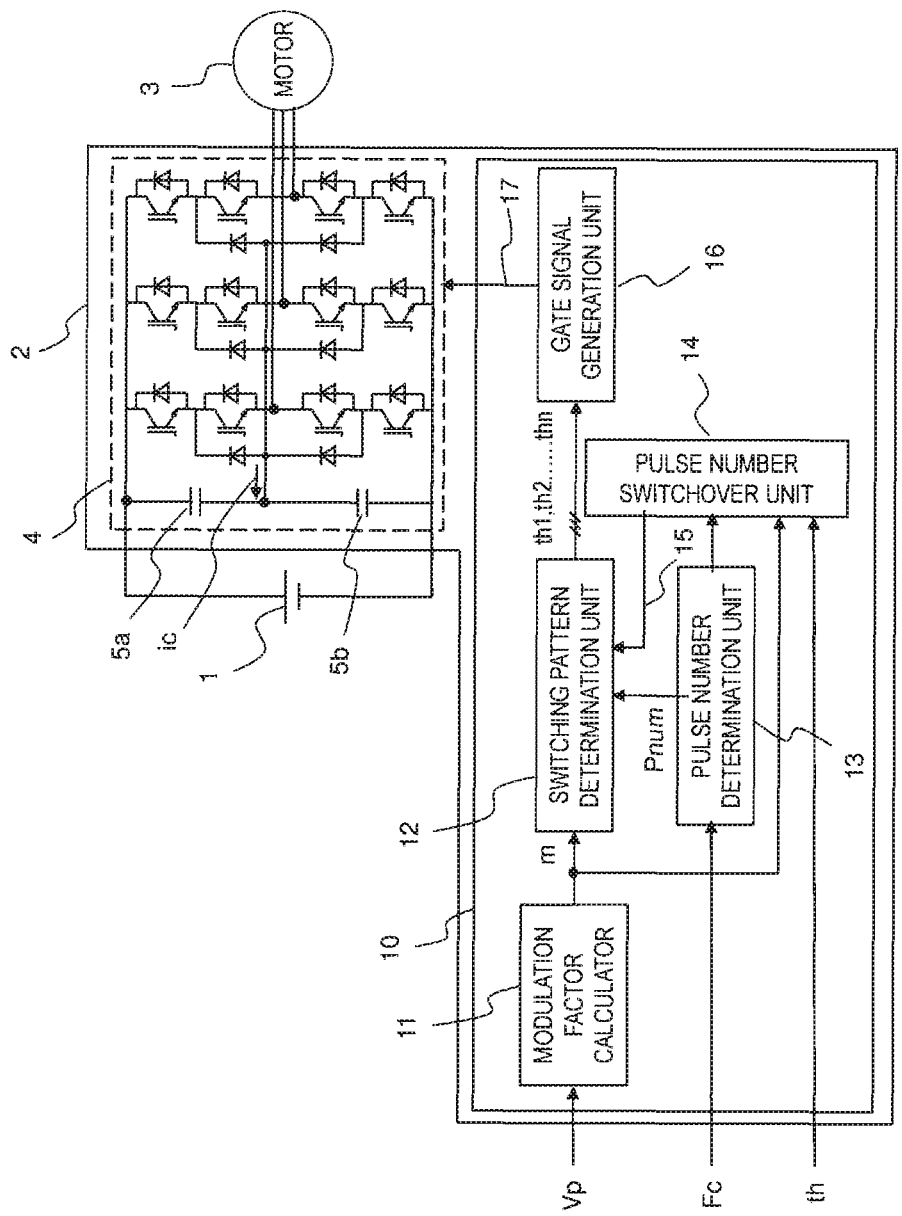
FIG. 21 is a block diagram showing the entire configuration of a power conversion device according to embodiment 3.

FIG. 21 shows the circuit configuration of a 3-level inverter as a power conversion device according to embodiment 3. Unlike the 5-level inverter, one DC power supply 1 is provided and 3-level switching legs for the respective phases are connected one by one for each phase to one DC input. As in the 5-level inverter, when one of the switching circuits for three phases outputs the C potential and then neutral point current ic flows to the C potential, the positive-side capacitor 5a or the negative-side capacitor 5b is charged or discharged, so that the voltage difference between the positive-side capacitor 5a and the negative-side capacitor 5b increases or decreases.

Figure 22:
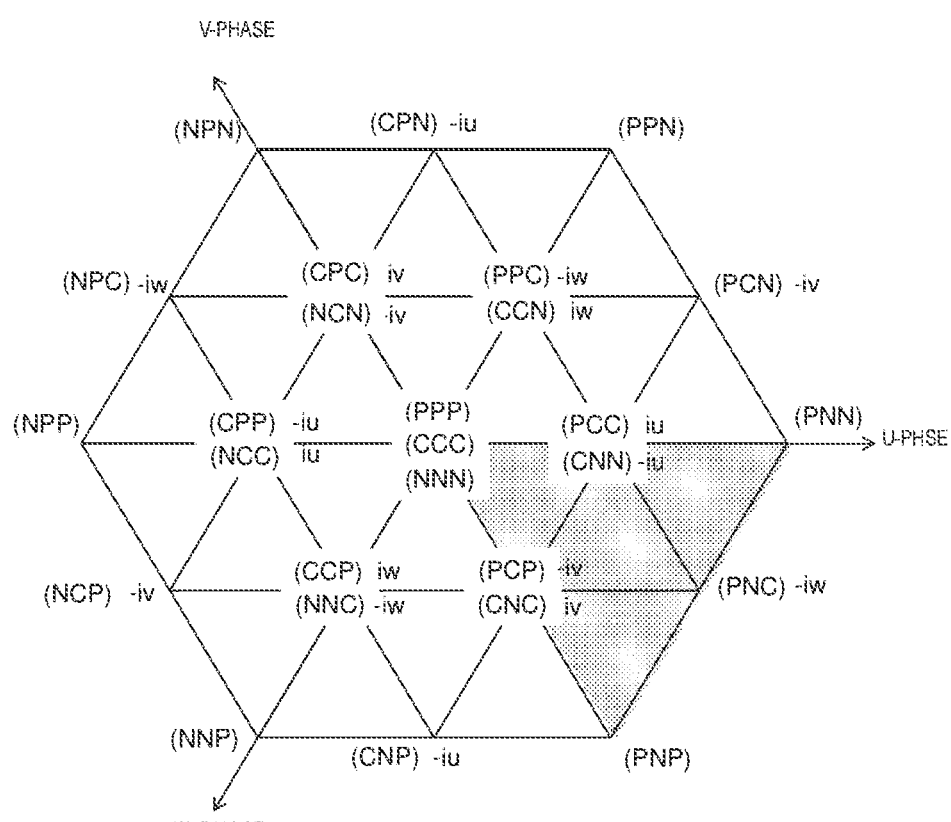
FIG. 22 is a vector diagram illustrating operation of the power conversion device according to embodiment 3.

Each of the outputs for the three phases u, v, w from the inverter 4 to the motor 3 is any of the P potential, the C potential, and the N potential in accordance with the switching state. A spatial vector (u-phase potential, v-phase potential, w-phase potential) is represented as shown in FIG. 22. If the present state is a three-phase balanced state, a shaded area in FIG. 22 is to be considered. FIG. 23 shows a correspondence table of the spatial vector and current flowing as the neutral point current ic at that time. It is noted that the described currents iu, iv, iw satisfy a relationship of iu+iv+iw=0. Where a difference between P-C voltage and C-N voltage is denoted by Vdiff, it is desirable that Vdiff is 0. From the vector diagram in FIG. 22 and the table in FIG. 23, Vdiff decreases in a case of ic>0, and Vdiff increases in a case of ic<0. For example, in a case of a vector CNN, when ic=−iu>0 is satisfied, the negative-side capacitor 5b is charged and Vdiff decreases, and when ic=−iu<0 is satisfied, the negative-side capacitor 5b is discharged and Vdiff increases.

The neutral point current ic flowing at each vector is as shown in FIG. 22. Among the vectors in the shaded area in FIG. 22, vectors that cause change in Vdiff are shown in a table in FIG. 24. Here, in cases of CNN and PCC, the same line-to-line voltage is outputted but increase/decrease in Vdiff is opposite to each other. The same applies to CNC and PCP.

In order to prevent Vdiff from being greatly expanded, it is necessary that the phase widths of the switching phase regions which cause an influence on Vdiff have no difference between the region where Vdiff increases and the region where Vdiff decreases. Therefore, the capacitor voltage difference limiting unit 127 of the pulse pattern determination unit 12 sets the fourth function Q having such a condition that the difference between the phase widths of the increase and decrease switching phase regions does not exceed the upper limit value thlim_sa in consideration of the relationship of the switching phases for respective phases of each spatial vector in FIG. 24, thereby determining a switching pattern in the same manner as with the 5-level switching pattern. A specific method therefor overlaps the method for the 5-level inverter described above and therefore description thereof is omitted. As described above, also in the case of the 3-level inverter, in designing of low-order harmonic reduction PWM, focusing on the switching phase regions which cause an influence on the difference between the positive-side capacitor voltage and negative-side capacitor voltage on the DC input side, the difference between the phase widths of the switching phase region where the voltage difference Vdiff increases and the switching phase region where the voltage difference Vdiff decreases is set to be small. Thus, it is possible to obtain a power conversion device capable of such PWM control that, even in a case where the load is high, the power factor is low, and the current is positive-negative asymmetric, the positive-side and negative-side voltages are less likely to be unbalanced and torque ripple due to the neutral point potential on the DC input side can be reduced.

Embodiment 4

The method for generating such PWM that reduces low-order harmonics and adjusts the switching phase regions so as to balance the positive-side capacitor voltage and the negative-side capacitor voltage according to the present disclosure can be achieved also by correcting the switching pattern for low-order harmonic reduction PWM calculated without using the method described in embodiment 1 or 2, e.g., the switching pattern obtained by Expression (3). In the capacitor voltage difference correction control for balancing the positive-side capacitor voltage and the negative-side capacitor voltage, instead of performing phase correction in consideration of the DC amount of imbalance of the positive-side and negative-side capacitor voltages as in conventional case, the switching phases to be corrected are selected on the basis of the difference between the phase widths of the switching phase regions where the capacitor voltage difference increases and decreases, harmonics, and the power factor of current, and correction is performed for the selected switching phases. Thus, it is possible to perform such control that suppresses occurrence of harmonics and current ripple and balances the capacitor voltages. In the present embodiment 4, this method will be described.

Figure 25:
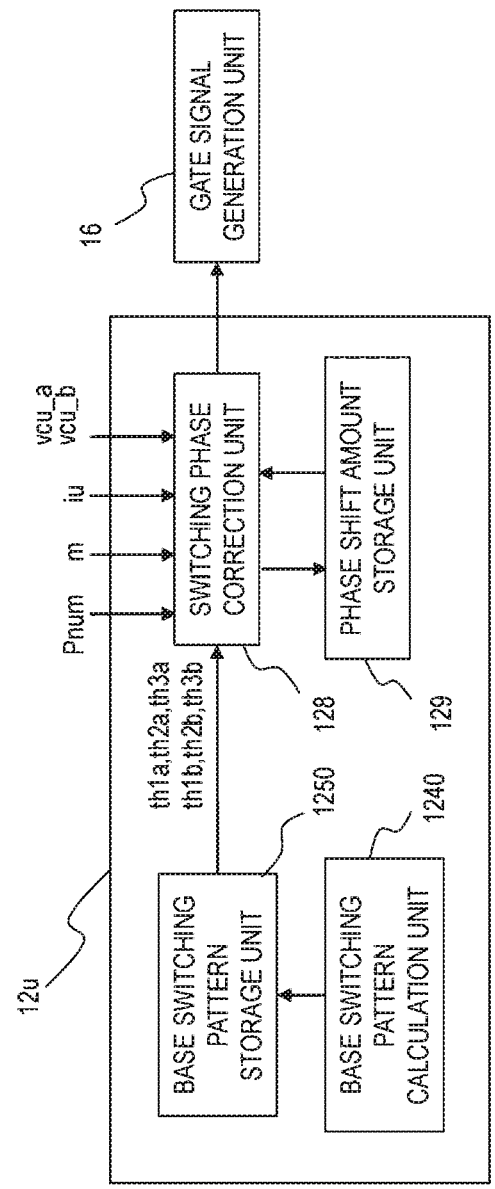
FIG. 25 is a block diagram showing the configuration of a gate signal generation unit in a power conversion device according to embodiment 4.

A circuit diagram of the entire configuration of the power conversion device 2 according to embodiment 4 is as shown in FIG. 1, and thus is the same as in embodiments 1 and 2. Switching phase correction for eliminating the voltage difference between the positive-side capacitor 5a and the negative-side capacitor 5b is performed in the switching pattern determination unit 12. FIG. 25 shows the internal configuration of a switching pattern determination unit 12u for U phase in the switching pattern determination unit 12 according to embodiment 4. The switching pattern determination unit 12u for U phase includes: a base switching pattern calculation unit 1240 which calculates a base switching pattern for each number of pulses in a predetermined range, over a predetermined range of modulation factors; a base switching pattern storage unit 1250 which stores the calculated base switching patterns; a switching phase correction unit 128 which reads, from the base switching pattern storage unit 1250, the base switching pattern corresponding to the number of pulses Pnum determined by the pulse number determination unit 13 and the modulation factor m calculated by the modulation factor calculator 11, and performs correction for the switching phases of the read base switching pattern; and a phase shift amount storage unit 129 which stores a phase shift amount for correcting the switching phases. The gate signal generation unit 16 generates the gate signal for ON/OFF driving each switching element 6, using a switching pattern corrected from the base switching pattern by the switching phase correction unit 128.

In the present embodiment 4, an example in which the number of pulses Pnum determined by the pulse number determination unit 13 is 3 as in embodiments 1 and 2 will be described. The base switching pattern calculation unit 1240 calculates, for each number of pulses in a predetermined range, over a predetermined range of modulation factors, the base switching pattern by calculating switching phases so as to satisfy conditions for ensuring the modulation factor, eliminating harmonic components for the respective orders of the inverter output voltage, and ensuring a predetermined value for the phase difference between predetermined adjacent switching phases. For example, the base switching pattern calculation unit 1240 obtains the base switching pattern as a base through calculation by Expression (3), and stores the obtained base switching pattern for each modulation factor in the base switching pattern storage unit 1250. In switching phase correction by the switching phase correction unit 128, the switching pattern is read in accordance with the modulation factor m from the base switching patterns stored in the base switching pattern storage unit 1250, and among the switching phases th1a, th2a, th3a, th1b, th2b, th3b of the read base switching pattern, switching phases are selected and corrected so that voltage vcu_a of the positive-side capacitor 5a and voltage vcu_b of the negative-side capacitor 5b are balanced and variations in low-order harmonics are minimized.

Figure 26:
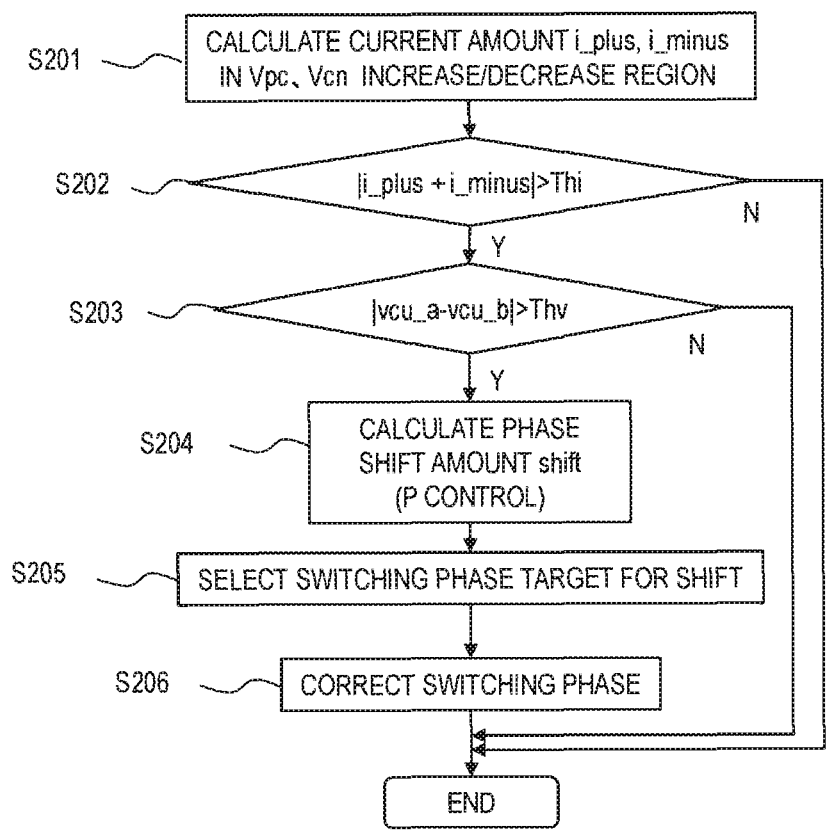
FIG. 26 is a first flowchart showing a process by a switching phase correction unit in the power conversion device according to embodiment 4.
Figure 27:
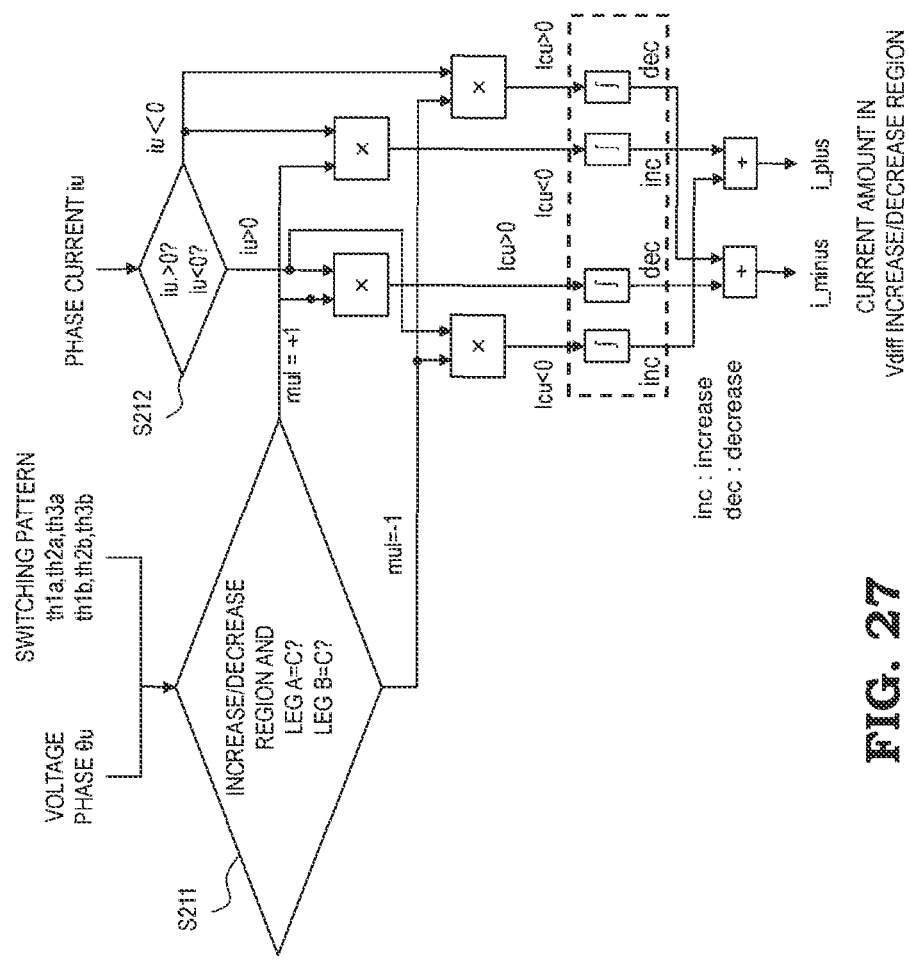
FIG. 27 is a second flowchart showing a process by the switching phase correction unit in the power conversion device according to embodiment 4.

The switching phase correction unit 128 receives the U-phase current iu detected by the current sensor 19 for detecting currents flowing through connection lines to the motor, the voltage vcu_a of the positive-side capacitor 5a and the voltage vcu_b of the negative-side capacitor 5b detected by the voltage sensor 20u, and the switching patterns th1a, th2a, th3a, th1b, th2b, th3b read in accordance with the modulation factor command m from the switching pattern table stored in the base switching pattern storage unit 1250. FIG. 26 is a flowchart showing the processing procedure for correcting the switching phases in the switching phase correction unit 128. First, in step S201, the current amounts in the switching phase regions where the difference between the positive-side capacitor voltage Vpc and the negative-side capacitor voltage Vcn increases and decreases, are calculated. FIG. 27 is a flowchart showing a detailed processing flow of the current amount calculation.

To describe U phase as an example, first, in step S211, on the basis of an output voltage phase θu for U phase and the switching phases th1a, th2a, th3a, th1b, th2b, th3b, which of P, N, and C the output potentials of the switching leg 8a (leg A) and the switching leg 8b (leg B) become in the region and whether θu is in the region where either the leg A or the leg B outputs the potential C, are determined, thereby determining whether the neutral point current icu is the same as the U-phase current iu or −1 times the U-phase current iu. That is, in a region where the leg A outputs the C potential and the leg B outputs the P potential or the N potential, the neutral point current icu is −1 times the U-phase current iu, and therefore a coefficient mul is −1. In a region where the leg B outputs the C potential and the leg A outputs the P potential or the N potential, the U-phase current iu is equal to the neutral point current icu, and therefore the coefficient mul is 1. Meanwhile, in step S212, whether the U-phase current iu is positive or negative is determined, and the neutral point current icu is calculated as U-phase current iu×mul, whereby the neutral point current icu and the sign thereof are determined. If the neutral point current icu is positive, the capacitor voltage difference Vdiff is in a decreasing direction, and therefore the integral value of icu in this region is added to a decreasing current integral value i_minus. If icu is negative, the capacitor voltage difference Vdiff is in an increasing direction, and therefore the integral value of icu in this region is added to an increasing current integral value i_plus. In this way, the neutral point current icu is individually integrated in each of the region where the capacitor voltage difference Vdiff increases and the region where the capacitor voltage difference Vdiff decreases, thereby calculating the current integral values i_plus and i_minus, respectively.

Returning to FIG. 26, in step S202, if the absolute value of the sum of the current integral value i_plus in the increase region and the current integral value i_minus in the decrease region is greater than a threshold Thi, the process proceeds to step S203. In step S203, the absolute value of the difference between the voltage vcu_a of the positive-side capacitor 5a and the voltage vcu_b of the negative-side capacitor 5b detected by the voltage sensor 20u is calculated. If the absolute value is greater than a predetermined value Thv, the process proceeds to the next step S204, to calculate a phase shift amount shift for correcting a phase so that the sum of the current integral value i_plus in the case where the capacitor voltage difference Vdiff increases and the current integral value i_minus in the case where the capacitor voltage difference Vdiff decreases becomes zero. Next, in step S205, a switching phase target for which the switching phase is shifted and corrected is selected.

Figure 28:
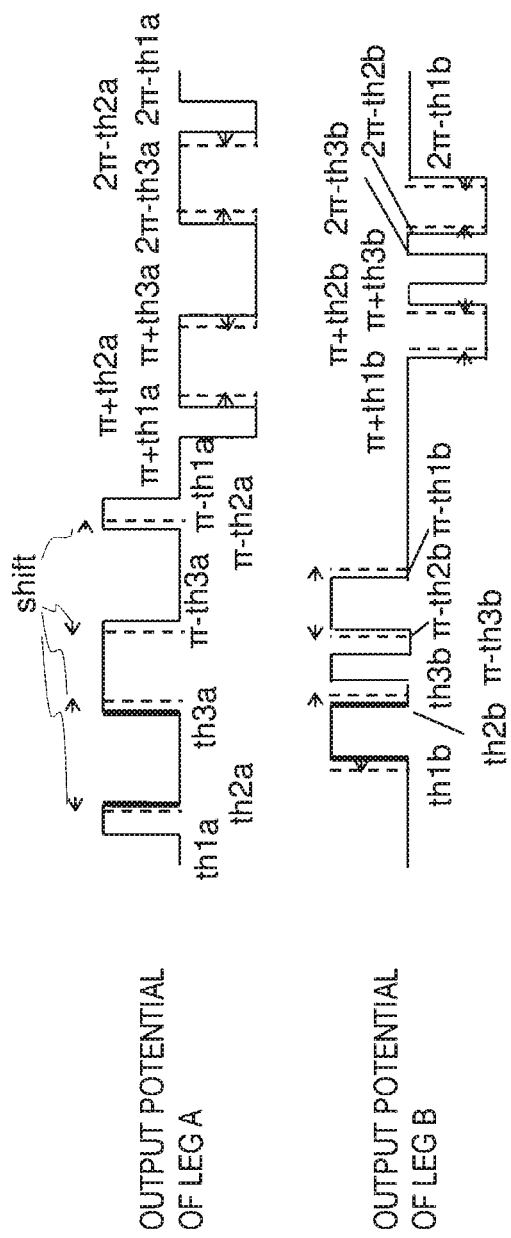
FIG. 28 illustrates an example of switching phase correction in the power conversion device according to embodiment 4.

FIG. 28 shows the switching phases and shift directions in a case where the capacitor voltage difference Vdiff (vcu_a−vcu_b) is smaller than −Thv. For example, in a case where pulse waveforms outputted by the two legs A and B are the waveforms shown in FIG. 13, the sum of the pulse regions th2a−th1a and th3b−th2b, and the pulse region th3a−th1b, are compared with each other, and the switching phases are corrected by being shifted so that the wider region is narrowed and the narrower region is expanded. At this time, in order to equally correct the pulses for the leg A and the pulses for the leg B and ensure that no difference arises in the harmonics and the fundamental wave as compared to those before correction, among the six switching phases, the switching phase th1a which is closest to zero degrees and the switching phase th3b which is closest to 90 degrees are excluded from correction targets. In the pulse waveforms shown in FIG. 28, the sum of the switching phase region widths (th2a−th1a) and (th3b−th2b) is longer than the switching phase region width (th3a−th1b). Accordingly, in a voltage phase range of 0 to 90°, in the switching phase regions th1a−th2a and th2b−th3b where Vdiff decreases, the phases th2a and th2b are selected and these switching phases are corrected by the phase shift amount shift calculated in step S204, in a direction to decrease the above switching phase region width. Further, in the region th3a−th1b where Vdiff increases, th3a and th1b are corrected by the phase shift amount shift, in a direction to increase the width of this region. In this way, as a result, the switching phases that are corrected for each of the leg A and the leg B are composed of one phase for pulse rising and one phase for pulse falling, and thus it is expected that variation in the fundamental wave amplitude is reduced.

In FIG. 28, all the phase shift amounts shift for the switching phases are the same. However, in consideration of harmonic reduction, the phase shift amounts for the selected switching phases th1b, th2b, th2a, th3a may be changed so that variation in the value of the function Y (th1a, th2a, th3a, th1b, th2b, th3b) which is the sum of squares of harmonics for respective orders, shown in Expression (10), becomes small.

As described above, by shifting and correcting the switching phases, it is possible to perform such phase correction for low-order harmonic reduction PWM that expansion of the positive-negative difference of the inverter output voltage is suppressed by reduction of the capacitor voltage difference and low-order harmonics can be reduced, without obtaining such switching patterns as not to expand the difference between the positive-side and negative-side capacitor voltages in advance through calculation as in embodiments 1 and 2.

It is noted that the phase shift amount used in the correction is stored in the phase shift amount storage unit 129, and in a case where it is necessary to further perform correction because of load variation or the like after correction, the phase shift amount stored in the phase shift amount storage unit 129 is further corrected to obtain a phase shift amount. Thus, even when the load varies, it is possible to perform such phase correction for low-order harmonic reduction PWM that can suppress expansion of the positive-negative difference of the inverter output voltage and can reduce low-order harmonics.

The methods for determining switching patterns according to the present disclosure, described thus far in embodiments 1 to 4, are summarized as follows: a switching pattern that is a switching phase group is calculated so as to satisfy conditions for ensuring the modulation factor, eliminating harmonic components for respective orders of the inverter output voltage, ensuring a predetermined value for the phase difference between predetermined adjacent switching phases, and balancing voltage of the positive-side capacitor and voltage of the negative-side capacitor.

Although various exemplary embodiments and examples are described in the present application, various features, aspects, and functions described in one or more embodiments are not inherent in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

DESCRIPTION OF THE REFERENCE CHARACTERS 1u, 1v, 1w DC voltage source
2 power conversion device
3 motor (load)
4 inverter
5a positive-side capacitor
5b negative-side capacitor
6 switching element
10 control unit
11 modulation factor calculator
12 switching pattern determination unit
13 pulse number determination unit
16 gate signal generation unit
19 load current detection unit 20u, 20v, 20w neutral point voltage sensor
121 modulation factor ensuring unit
122 harmonic reduction unit
123 function combining unit
124 switching phase calculation unit
125 switching pattern storage unit
126 switching phase difference limiting unit
127 capacitor voltage difference limiting unit
128 switching phase correction unit
1240 base switching pattern calculation unit
1250 base switching pattern storage unit

The invention claimed is:

1. A power conversion device comprising:
an inverter which includes switching elements, and which receives DC voltage of a DC voltage source and converts the DC voltage to variable-voltage variable-frequency AC voltage, to output the AC voltage to a load;
a controller configured to perform PWM control for ON/OFF driving the switching elements on the basis of an output voltage command value and an output frequency command value; and
a series unit of a positive-side capacitor and a negative-side capacitor, the series unit being connected on an input side of the inverter between a positive side and a negative side of the DC voltage, wherein
the inverter has, as output potentials, at least a positive-side potential and a negative-side potential of the DC voltage source and a potential of a neutral point which is a connection point between the positive-side capacitor and the negative-side capacitor,
the controller configured to execute a program stored in a memory that stores the program which, when executed by the controller, results in performance of steps comprising,
calculating a modulation factor for the inverter on the basis of the DC voltage of the DC voltage source and the output voltage command value,
determining a number of pulses per half cycle of a fundamental wave in the PWM control on the basis of the output frequency command value,
calculating a switching pattern for specifying switching phases which are timings of ON/OFF driving the switching elements on the basis of the calculated modulation factor and the determined number of pulses, so as to satisfy conditions for
ensuring the modulation factor,
eliminating harmonic components for respective orders of output voltage of the inverter,
ensuring a predetermined value for a phase difference between predetermined adjacent two of the switching phases, and
balancing voltage of the positive-side capacitor and voltage of the negative-side capacitor, and
generating a gate signal for ON/OFF driving the switching elements on the basis of the calculated switching pattern.

2. The power conversion device according to claim 1, wherein
the steps further include calculating, for each number of pulses in a predetermined range, over a predetermined range of modulation factors, switching patterns in advance by performing calculation so as to satisfy conditions for
ensuring the modulation factor,
eliminating the harmonic components for the respective orders of the output voltage of the inverter,
ensuring the predetermined value for the phase difference between the predetermined adjacent two switching phases, and
ensuring that, regarding regions of switching phases where current flows from the inverter to the neutral point in the half cycle of the fundamental wave, a difference between
a phase width of the region where a voltage difference between the positive-side capacitor and the negative-side capacitor increases, and a phase width of the region where the voltage difference decreases, becomes equal to or smaller than a predetermined value,
storing the calculated switching patterns, for each number of pulses in the predetermined range, over the predetermined range of the modulation factors,
reading a switching pattern corresponding to the calculated modulation factor and the determined number of pulses, and generating the gate signal for ON/OFF driving the switching elements on the basis of the read switching pattern.

3. The power conversion device according to claim 2, wherein
the steps further include
generating a first function for ensuring the modulation factor and associating a fundamental wave component of an output waveform of the inverter and the modulation factor with each other, with the switching phases used as variables,
generating a second function that is a sum value of harmonic elements for the respective orders determined by the harmonic components for the respective orders of the output waveform of the inverter, with the switching phases used as variables,
generating a third function for prescribing the phase difference between the predetermined adjacent two switching phases, with the two switching phases used as variables,
generating a fourth function for prescribing the difference between the phase width of the switching phase region where the voltage difference between the positive-side capacitor and the negative-side capacitor increases and the phase width of the switching phase region where the voltage difference decreases, with the switching phases used as variables,
setting an evaluation function composed of the first function, the second function, the third function, the fourth function, and one or more additional variables, with the switching phases and the additional variables used as variables, and
calculating the switching pattern by minimizing the evaluation function with respect to the switching phases and the additional variables.

4. The power conversion device according to claim 3, wherein
the additional variables are weighting variables for weighting one or more of: a sub-function included in the first function; the second function; the third function; and the fourth function.

5. The power conversion device according to claim 1, wherein
the steps further include
calculating, for each number of pulses in a predetermined range, over a predetermined range of modulation factors, base switching patterns by calculating the switching phases so as to satisfy conditions for
ensuring the modulation factor, eliminating the harmonic components for the respective orders of the output voltage of the inverter, and ensuring the predetermined value for the phase difference between the predetermined adjacent two switching phases, storing the calculated base switching patterns, for each number of pulses in the predetermined range, over the predetermined range of the modulation factors, and reading a base switching pattern corresponding to the calculated modulation factor and the determined number of pulses, and corrects the switching phases included in the read base switching pattern so that, regarding regions where current flows to the neutral point, an absolute value of a sum of a current integral value at the neutral point in the region where a voltage difference between the positive-side capacitor and the negative-side capacitor increases and a current integral value at the neutral point in the region where the voltage difference decreases, becomes equal to or smaller than a predetermined value, thereby calculating the switching pattern.

6. A driving method for a power conversion device, the power conversion device including an inverter which includes switching elements, and which performs PWM control for ON/OFF driving the switching elements on the basis of an output voltage command value and an output frequency command value, thereby converting received DC voltage of a DC voltage source to variable-voltage variable-frequency AC voltage and outputting the AC voltage to a load, and a series unit of a positive-side capacitor and a negative-side capacitor, the series unit being connected on an input side of the inverter between a positive side and a negative side of the DC voltage, the inverter having, as output potentials, at least a positive-side potential and a negative-side potential of the DC voltage source and a potential of a neutral point which is a connection point between the positive-side capacitor and the negative-side capacitor, the driving method comprising:

calculating a modulation factor for the inverter on the basis of the DC voltage of the DC voltage source and the output voltage command value;

calculating a number of pulses per half cycle of a fundamental wave in the PWM control on the basis of the output frequency command value;

in accordance with the calculated number of pulses, calculating and determining a switching pattern for specifying switching phases which are timings of ON/OFF driving the switching elements, so as to satisfy conditions for ensuring the calculated modulation factor, eliminating harmonic components for respective orders of output voltage of the inverter, ensuring a predetermined value for a phase difference between predetermined adjacent ones of the switching phases, and balancing voltage of the positive-side capacitor and voltage of the negative-side capacitor; and driving the switching elements by the determined switching pattern.

7. The driving method for the power conversion device according to claim 6, the driving method comprising:

calculating a base switching pattern so as to satisfy conditions for ensuring the calculated modulation factor, eliminating the harmonic components for the respective orders of the output voltage of the inverter, and ensuring the predetermined value for the phase difference between the predetermined adjacent switching phases; and correcting the switching phases included in the calculated base switching pattern so that, regarding regions where current flows to the neutral point, an absolute value of a sum of a current integral value at the neutral point in the region where a voltage difference between the positive-side capacitor and the negative-side capacitor increases and a current integral value at the neutral point in the region where the voltage difference decreases, becomes equal to or smaller than a predetermined value, thereby determining the switching pattern.

* * * * *